United States Patent
Aragone et al.

(10) Patent No.: US 10,402,877 B2
(45) Date of Patent: Sep. 3, 2019

(54) ONLINE TRANSACTION PROCESSING SYSTEM FOR MULTI-PRODUCT TRANSACTIONS

(71) Applicant: Amadeus S.A.S., Biot (FR)

(72) Inventors: Matteo Aragone, Genoa (IT);
Jean-Chafic Hays, Nice (FR);
Guillaume Van De Kerckhove,
Pegomas (FR); Emmanuelle Geoffroy,
Tourrettes sur Loup (FR); Mustapha Rachid, Antibes (FR)

(73) Assignee: AMADEUS S.A.S., Biot (FR)

( * ) Notice: Subject to any disclaimer, the term of this patent is extended or adjusted under 35 U.S.C. 154(b) by 740 days.

(21) Appl. No.: 15/080,171

(22) Filed: Mar. 24, 2016

(65) Prior Publication Data

US 2017/0278157 A1  Sep. 28, 2017

(51) Int. Cl.
*G06Q 30/00* (2012.01)
*G06Q 30/06* (2012.01)
*G06Q 20/40* (2012.01)

(52) U.S. Cl.
CPC ....... *G06Q 30/0609* (2013.01); *G06Q 20/405* (2013.01); *G06Q 20/4016* (2013.01)

(58) Field of Classification Search
CPC .............................................. G06Q 30/06–08
USPC .............................................. 705/26.1–27.2
See application file for complete search history.

(56) References Cited

U.S. PATENT DOCUMENTS

| | | |
|---|---|---|
| 8,260,720 B1 | 9/2012 | Dixon et al. |
| 9,367,563 B2 | 6/2016 | Fontebride et al. |
| 2003/0069820 A1 | 4/2003 | Hillmer et al. |
| 2004/0054560 A1 | 3/2004 | Levionnais et al. |
| 2004/0068501 A1 | 4/2004 | McGoveran |
| 2006/0229958 A1 | 10/2006 | Sergio et al. |
| 2008/0082373 A1 | 4/2008 | Durocher et al. |
| 2010/0250290 A1 | 9/2010 | Lefkowitz et al. |
| 2010/0299230 A1 | 11/2010 | Patterson et al. |

(Continued)

FOREIGN PATENT DOCUMENTS

| | | |
|---|---|---|
| FR | 2816087 A1 | 5/2002 |
| FR | 3021789 A1 | 12/2015 |

OTHER PUBLICATIONS

National Institute of Industrial Property, Preliminary Search Report issued in French Application No. 1652510 dated Jan. 24, 2017.

(Continued)

*Primary Examiner* — Ethan D Civan
(74) *Attorney, Agent, or Firm* — Thompson Hine LLP

(57) ABSTRACT

Systems, methods, and computer program products for processing an online transaction to purchase a set of products. In response to receiving a request to process a transaction to purchase the set of products, an On-Line Transaction Processing (OLTP) system retrieves data from a corresponding database record that defines the set of products being purchased. The database record may also define a seller, a supplier, and a merchant for each product. For each product having the seller as the merchant, the OLTP determines a form of payment to be used to pay the supplier of the product based on rules governing forms of payment retrieved from a payment rules database. When the forms of payment have been determined, the OLTP system may add data to the database record that identifies the form of payment used to pay the supplier for each product in the record.

20 Claims, 21 Drawing Sheets

(56) References Cited

U.S. PATENT DOCUMENTS

| | | |
|---|---|---|
| 2012/0158541 A1 | 6/2012 | Ganti et al. |
| 2013/0103438 A1 | 4/2013 | Vernitsky et al. |
| 2014/0052714 A1 | 2/2014 | Brodziak et al. |
| 2015/0039356 A1 | 2/2015 | Cornelius et al. |
| 2015/0149220 A1 | 5/2015 | Omar |
| 2015/0161528 A1 | 6/2015 | Yalcin et al. |
| 2015/0161610 A1* | 6/2015 | Sahadevan ......... G06Q 20/4016 705/44 |
| 2016/0026992 A1 | 1/2016 | Park et al. |
| 2016/0041840 A1 | 2/2016 | Daouk et al. |
| 2016/0042471 A1 | 2/2016 | Barrett et al. |
| 2016/0125546 A1 | 5/2016 | Bostic et al. |
| 2017/0186057 A1 | 6/2017 | Metnick |
| 2018/0204146 A1 | 7/2018 | Shaffi |

OTHER PUBLICATIONS

National Institute of Industrial Property, Preliminary Search Report issued in French Application No. 1652514 dated Jan. 31, 2017.

USPTO, Office Action issued in U.S. Appl. No. 15/080,197 dated Oct. 30, 2018.

USPTO, Office Action issued in U.S. Appl. No. 15/080,163 dated Sep. 10, 2018.

USPTO, Office Action issued in U.S. Appl. No. 15/080,182 dated Sep. 7, 2018.

USPTO, Office Action issued in U.S. Appl. No. 15/080,188 dated Sep. 21, 2018.

USPTO, Office Action issued in U.S. Appl. No. 15/080,188 dated Mar. 28, 2019.

Tungate, Scott Michael, Examiner, USPTO, final Office Action issued in U.S. Appl. No. 15/080,197 dated Apr. 26, 2019.

* cited by examiner

ONLINE TRANSACTION PROCESSING SYSTEM FOR MULTI-PRODUCT TRANSACTIONS

BACKGROUND

The invention generally relates to computers and computer systems and, in particular, to methods, systems, and computer program products that process online transactions involving the purchase of multiple products.

Modern electronic commerce typically involves the sharing and processing of data across multiple computing systems interconnected by a network. In this environment, transactions that involve multiple product suppliers may result in complex interactions between supplier systems to insure that each product is concurrently priced and available. Systems on the buyer side may also contribute to this complexity by involving multiple forms of payment, each of which may require data processing by one or more bank, payment, or secure transaction computer systems. To support increasingly large input data sets and associated data manipulation tasks, which may be distributed across multiple computing systems, online transaction processing systems require sophisticated transaction management processes. These processes may manage communication between buyer, seller, supplier, and payment systems, and may employ database optimization techniques to enable processing of large numbers of transactions while providing high availability, speed, concurrency, and recoverability of the online transactions.

Thus, improved systems, methods, and computer program products for online transaction processing are needed to improve the accuracy and speed with which online transactions involving the purchase of multiple products are completed.

SUMMARY

In an embodiment of the invention, an online transaction processing system is provided. The system includes one or more processors, and a memory coupled to the processors. The memory stores data comprising program code that, when executed by at least one of the processors, causes the system to receive data that defines a transaction to purchase an itinerary including one or more products, a seller of the products, and one or more suppliers of the products. The system may retrieve a first set of rules for assigning merchants to the products at a transaction level, and assign a merchant to each product based on the first set of rules and one or more characteristics of the transaction. The system may further retrieve a second set of rules for assigning the merchants to the products at a product level, and update each assignment based on the second set of rules, one or more characteristics of the product, and one or more characteristics of the assignment.

In another embodiment of the invention, a method of processing the transaction is provided. The method includes receiving the data that defines the transaction, the seller of the products, and the suppliers of the products. The method retrieves the first set of rules for assigning merchants to the products at the transaction level, and assigns the merchant to each product based on the first set of rules and the characteristics of the transaction. The method further retrieves the second set of rules for assigning merchants to the products at the product level, and updates each assignment based on the second set of rules, the characteristics of the product, and the characteristics of the assignment.

In another embodiment of the invention, a computer program product for processing an online transaction is provided. The computer program product includes a non-transitory computer-readable storage medium, and program code stored on the medium that, when executed by one or more processors, causes the processors to receive the data defining the transaction to purchase the itinerary, the seller of the products, and the suppliers of the products. The program code causes the processors to retrieve the first set of rules for assigning merchants to the products at the transaction level, and assign the merchant to each product based on the first set of rules and the characteristics of the transaction. The program code further causes the processors to retrieve the second set of rules for assigning the merchants to the products at the product level, and update each assignment based on the second set of rules, the characteristics of the product, and the characteristics of the assignment.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention are directed to systems, methods, and computer program products for managing online transactions involving the purchase of multiple products, such as a set of travel related products comprising an itinerary for a trip. Embodiments of the invention may be implemented by an On-Line Transaction Processing (OLTP) system comprising one or more networked computers or servers. The OLTP system may be configured to handle a complex itinerary that includes heterogeneous products, such as flights, hotels, cars, cruises, attractions, and travel insurance products from multiple suppliers. The itinerary may be defined in a database record that provides a centralized storage location for data relating to the processing of the online transaction. The database record, together with data defining one or more forms of payment used to settle the transaction, may be processed sequentially by a plurality of modules to complete the transaction. These modules may determine a merchant and one or more forms of payment for each product in the itinerary, as well as identify critical and recoverable products in the itinerary. This data may be associated with the products in the database record, and used by the OLTP system to book and issue contracts on the products.

In the event the OLTP system encounters an error, or processing of the transaction is halted for any other reason, the database record may be queued until processing can be restarted. In response to receiving a request to restart the process, the OLTP system may determine the status of each product based on the database record. Based on the status of each product, the OLTP system may further determine a processing sequence for the products that allows the transaction to be completed, and process the products in the determined sequence.

Figure 1:
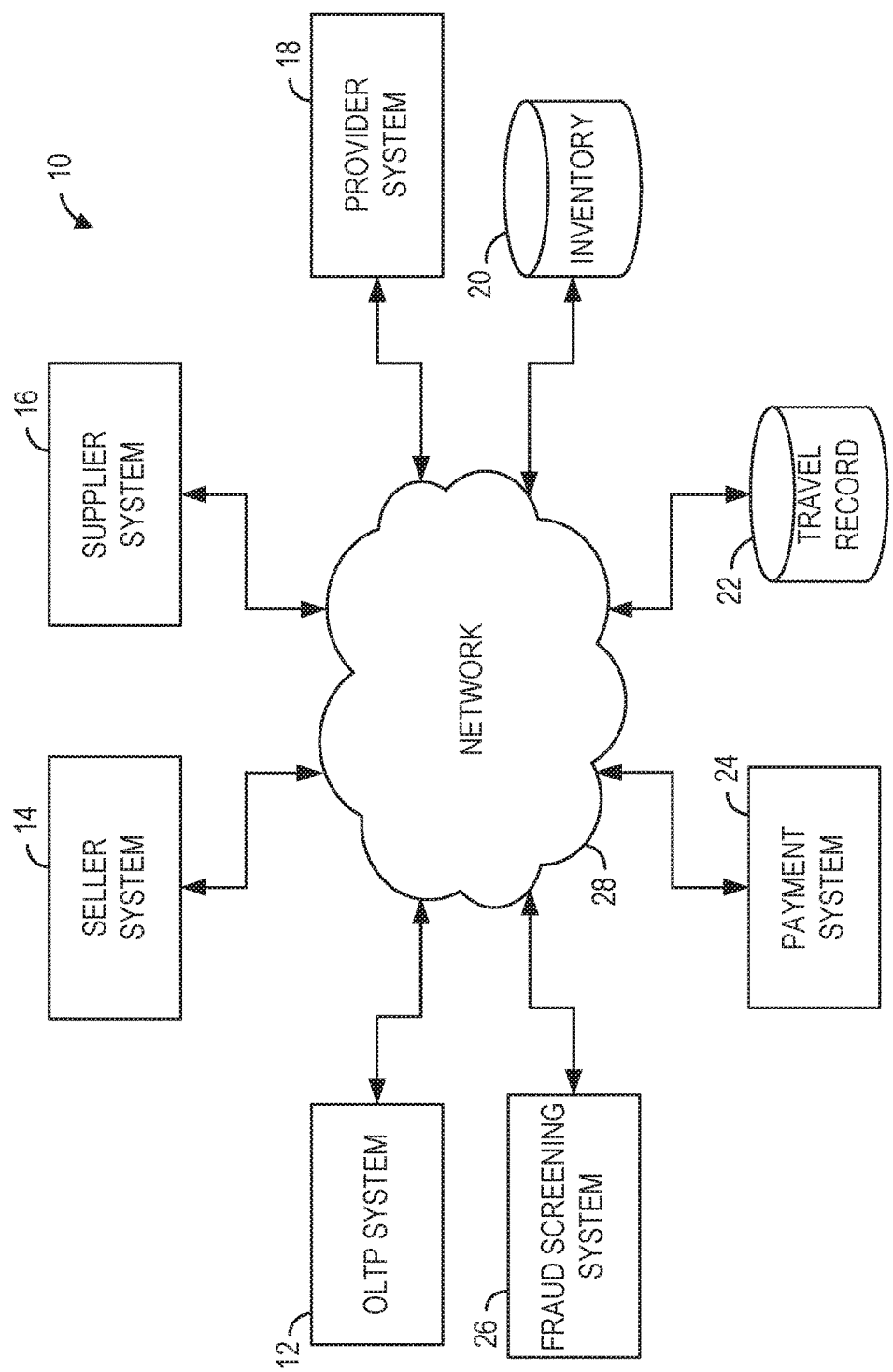
FIG. 1 is a diagrammatic view of an exemplary operating environment including an On-Line Transaction Processing (OLTP) system in communication with a seller system and a supplier system.

Referring now to FIG. 1, an operating environment 10 in accordance with an embodiment of the invention may include an OLTP system 12, a seller system 14, a supplier system 16, a provider system 18, an inventory database 20, a travel record database 22, a payment system 24, and a fraud screening system 26. Each of the OLTP system 12, seller system 14, supplier system 16, provider system 18, inventory database 20, travel record database 22, payment system 24, and fraud screening system 26 may communicate through a network 28. The network 28 may include one or more private or public networks (e.g., the Internet) that enable the exchange of data between systems connected to the network 28.

The OLTP system 12 may be configured to process online transactions to purchase a set of products. The set of products may include products from one or more suppliers and/or providers of products, such as an air or rail carrier, a hotel, car rental company, cruise company, or other supplier or provider of travel products. A supplier may be an entity that invoices and receives payment from a buyer of the product, and a provider may be an entity that delivers the product. In some cases, the supplier and the provider may be the same entity, in which case the terms may be used interchangeably. This would be the case, for example, when a carrier provides a seat for a flight, and invoices the buyer for booking the seat. The buyer may pay the seller for a product in cases where the seller is the merchant, or pay the supplier for the product cases where the supplier is the merchant.

Each set of products may comprise, for example, an itinerary for a trip sold by an indirect seller of the products, such as a travel agency. In an embodiment of the invention, the OLTP system 12 may include or be part of a Global Distribution System (GDS) configured to facilitate communication between the seller system 14 and one or more supplier systems 16 and/or provider systems 18. The GDS may enable travel agents, validating carriers, or other indirect sellers to book reservations on the supplier system 16 via the GDS. The GDS may maintain links to a plurality of supplier systems 16 via the network 28 that enables the GDS to route reservation requests from the indirect seller to a corresponding supplier of the product being reserved. The seller system 14 may thereby book travel products from multiple suppliers via a single connection to the GDS.

The supplier system 16 and/or provider system 18 may include a Computer Reservation System (CRS) that enables the OLTP system 12 to reserve and book travel products. The supplier system 16 and provider system 18 may also interact with other supplier or provider systems, either directly or through the GDS, to enable a supplier, such as a validating carrier, to sell products provided by a provider, such as an operating carrier. In cases where the supplier and provider are different entities, the provider may bill the supplier for the products provided.

The supplier system 16 and provider system 18 may include an electronic document system, such as an Electronic Ticketing System (ETS), configured to maintain records of the purchase, use, and exchange of documents, such as contracts, issued by the corresponding supplier or provider. The electronic document system may access the travel record database 22 and/or other database of records as needed to track the status of contracts issued by the supplier or provider. Data defining and tracking use of a contract may be stored in a corresponding record in the travel record database 22, and as one or more documents in the electronic document system.

The supplier system 16 may include back-office and/or middle-office systems configured to enable buyers to settle accounts with the supplier. These office accounting systems may host secure e-commerce software that manages supplier databases to maintain records of the supplier's sales and purchase transactions, update the inventory database 20, as well as track invoices, receipts, and reports.

In response to the traveler reserving a product, the OLTP system 12 may store data in the travel record database 22 that identifies the reserved product. This data may be maintained in a database record referred to as a travel record. The travel record may include one or more data fields which contain product, traveler, and other information associated with one or more reserved products in the itinerary. Each travel record may include data defining the itinerary for a particular trip, traveler, or group of travelers. The defined itinerary may include travel products from multiple suppliers and/or providers of travel products. To facilitate locating the travel record in the travel record database 22, a record locator or other suitable identifier may be associated with the travel record.

The payment system 24 may be configured to process forms of payment related to the purchase of products by the customer. The payment system 24 may be configured to exchange data with one or more bank systems, such as an issuing bank system and/or an acquiring bank system, to authorize payment and transfer funds between accounts. In the case of a purchase paid for at least in part by a credit or debit card, at the time of the transaction, the payment system 24 may transmit an authorization request to the issuing bank system, which may be determined from the issuer identification number of the card. In response to receiving the authorization request, the issuing bank system may verify the account is valid, and that the account has sufficient funds to cover the amount of the transaction. The issuing bank system may then transmit an authorization response to the payment system 24 indicating that the transaction has been approved, declined, or that more information is required.

The process of booking a reserved itinerary may include checking the inventory database 20 for availability of the products identified by the reserved itinerary, e.g., seat availability on a flight, room vacancies in a hotel, etc. This check may include sending a reservation request from OLTP system 12 to one or more supplier systems 16. If the requested products are available, the products may be booked, a booking confirmation transmitted to the OLTP system 12, and the inventory in the inventory database 20 adjusted to reflect the booking. In response to the traveler approving the transaction, payment may be made from the traveler to the merchant by billing the traveler's account for the price of the services. In response to receiving payment, the booking may be confirmed by the supplier system 16.

The fraud screening system 26 may receive requests to analyze customer forms of payment being used to complete a transaction, and determine a level of risk associated with the customer form of payment (FOP). The level of risk may be determined based one or more characteristics of the form of payment, the customer, and/or the transaction. For example, the fraud screening system 26 may perform data integrity checks, compare the characteristics of the pending transaction with characteristics of known fraudulent transactions, search a transaction history database to identify abnormal velocity patterns, name and address changes, and known defrauders. The fraud screening system 26 may generated a risk assessment (e.g., fraud detected, challenge recommended, or no fraud detected) and return the risk assessment to the OLTP system 12.

Figure 2:
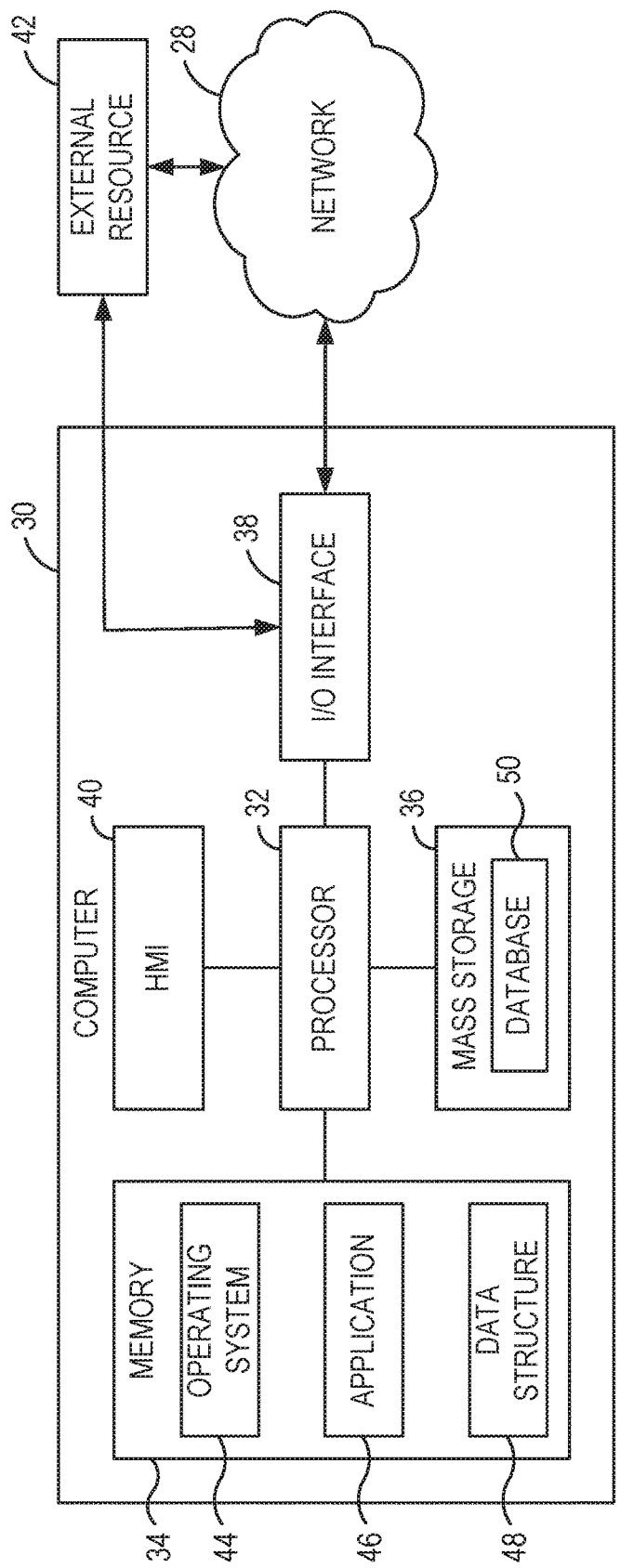
FIG. 2 is a diagrammatic view of an exemplary computer that may be used to provide the operating environment of FIG. 1.

Referring now to FIG. 2, the OLTP system 12, seller system 14, supplier system 16, provider system 18, inventory database 20, travel record database 22, payment system 24, fraud screening system 26, and network 28 of operating environment 10 may be implemented on one or more computer devices or systems, such as exemplary computer 30. The computer 30 may include a processor 32, a memory 34, a mass storage memory device 36, an input/output (I/O) interface 38, and a Human Machine Interface (HMI) 40. The computer 30 may also be operatively coupled to one or more external resources 42 via the network 28 or I/O interface 38. External resources may include, but are not limited to, servers, databases, mass storage devices, peripheral devices, cloud-based network services, or any other suitable computer resource that may be used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, volatile or non-volatile solid state device, or any other device capable of storing information.

The processor 32 may operate under the control of an operating system 44 that resides in memory 34. The operating system 44 may manage computer resources so that computer program code embodied as one or more computer software applications, such as an application 46 residing in memory 34, may have instructions executed by the processor 32. The processor 32 may also execute the application 46 directly, in which case the operating system 44 may be omitted. The one or more computer software applications may include a running instance of an application comprising a server, which may accept requests from, and provide responses to, one or more corresponding client applications. One or more data structures 48 may also reside in memory 34, and may be used by the processor 32, operating system 44, or application 46 to store or manipulate data.

The I/O interface 38 may provide a machine interface that operatively couples the processor 32 to other devices and systems, such as the network 28 or external resource 42. The application 46 may thereby work cooperatively with the network 28 or external resource 42 by communicating via the I/O interface 38 to provide the various features, functions, applications, processes, or modules comprising embodiments of the invention. The application 46 may also have program code that is executed by one or more external resources 42, or otherwise rely on functions or signals provided by other system or network components external to the computer 30. Indeed, given the nearly endless hardware and software configurations possible, persons having ordinary skill in the art will understand that embodiments of the invention may include applications that are located externally to the computer 30, distributed among multiple computers or other external resources 42, or provided by computing resources (hardware and software) that are provided as a service over the network 28, such as a cloud computing service.

The HMI 40 may be operatively coupled to the processor 32 of computer 30 to enable a user to interact directly with the computer 30. The HMI 40 may include video or alpha-numeric displays, a touch screen, a speaker, and any other suitable audio and visual indicators capable of providing data to the user. The HMI 40 may also include input devices and controls such as an alphanumeric keyboard, a pointing device, keypads, pushbuttons, control knobs, microphones, etc., capable of accepting commands or input from the user and transmitting the entered input to the processor 32.

A database 50 may reside on the mass storage memory device 36, and may be used to collect and organize data used by the various systems and modules described herein. The database 50 may include data and supporting data structures that store and organize the data. In particular, the database 50 may be arranged with any database organization or structure including, but not limited to, a relational database, a hierarchical database, a network database, an object-oriented database, or combinations thereof.

A database management system in the form of a computer software application executing as instructions on the processor 32 may be used to access the information or data stored in records of the database 50 in response to a query, where a query may be dynamically determined and executed by the operating system 44, other applications 46, or one or more modules. Although embodiments of the invention may be described herein using relational, hierarchical, network, object-oriented, or other database terminology in specific instances, persons having ordinary skill in the art will understand that embodiments of the invention may use any suitable database management model, and are not limited to any particular type of database.

Figure 3:
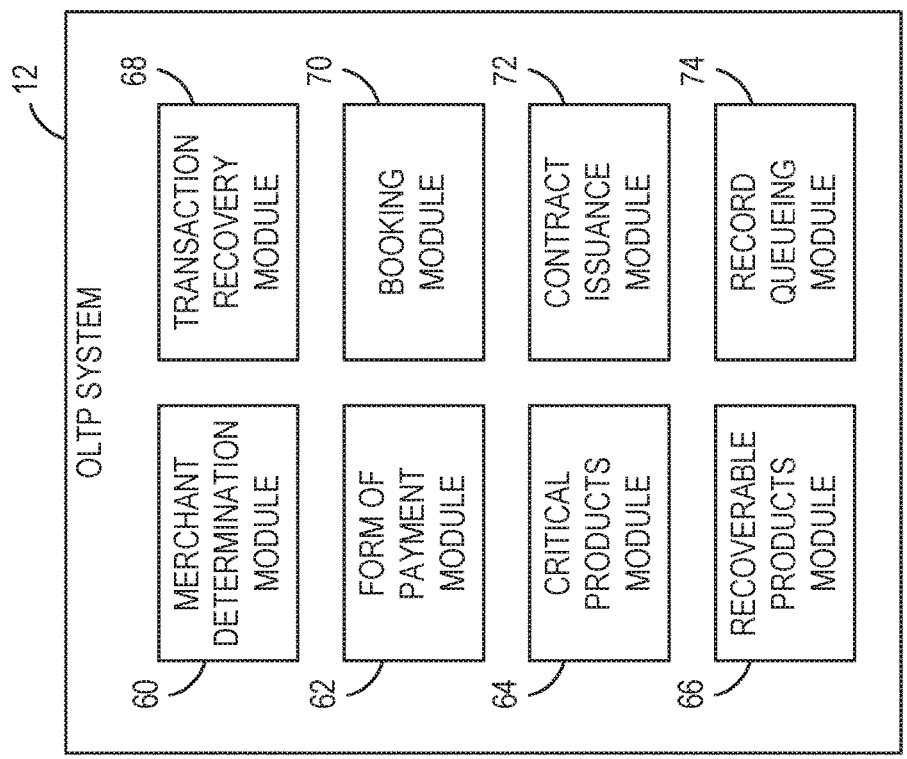
FIG. 3 is a diagrammatic view of the OLTP system depicting a merchant determination module, a form of payment module, a critical products module, a recoverable products module, a transaction recovery module, a booking module, a contract issuance module, and a record queuing module.

Referring now to FIG. 3, the OLTP system 12 may include merchant determination module 60, a form of payment module 62, a critical products module 64, a recoverable products module 66, a transaction recovery module 68, a booking module 70, a contract issuance module 72, and a queuing module 74. The OLTP system 12 may orchestrate operation of the modules to process transactions by calling modules to process one or more products defined by the travel record in a sequence determined by the OLTP system 12. To processes the transaction, the modules of the OLTP system 12 may retrieve data from, and/or transmit data to, one or more of the seller system 14, supplier system 16, inventory database 20, travel record database 22, payment system 24, fraud screening system 26, or other suitable systems.

Merchant Determination

In a conventional OLTP system, the seller typically assumes the role of merchant for the whole transaction. As a result, the seller may be accountable for the entire amount of the sale, including the portions of the payment transferred to the suppliers of the products. Forcing the seller to assume the role of merchant may also limit which products can be included in an itinerary being sold by the seller because some suppliers may refuse to allow their products to be distributed by third party sellers acting as merchants. For example, a carrier may require that they be the merchant for sales of flights in order to maintain control over fare policies. The OLTP system may also be required to process multiple forms of payment, such as credit cards, such as gift cards, or fidelity programs, which may further impact the ability of the OLTP system to select the merchant for each product.

Determining the merchant for each product may require accounting for multiple variables, such as specific commercial agreements between the seller and the supplier. Some commercial agreements may require that the seller merely act as an intermediary between the buyer and the supplier. Other commercial agreements may require that the seller be responsible for the sale. Agreements that require the seller to be the merchant may apply in cases where the seller purchases products from the supplier for resale to the buyer, such as blocks of space from an inventory of a carrier. Because sellers may enter into a large number of commercial agreements, and each commercial agreement may depend on a number of conditions, the task of determining the merchant for each product of a transaction may be too complex to determine without a specialized computer system.

Figure 4:
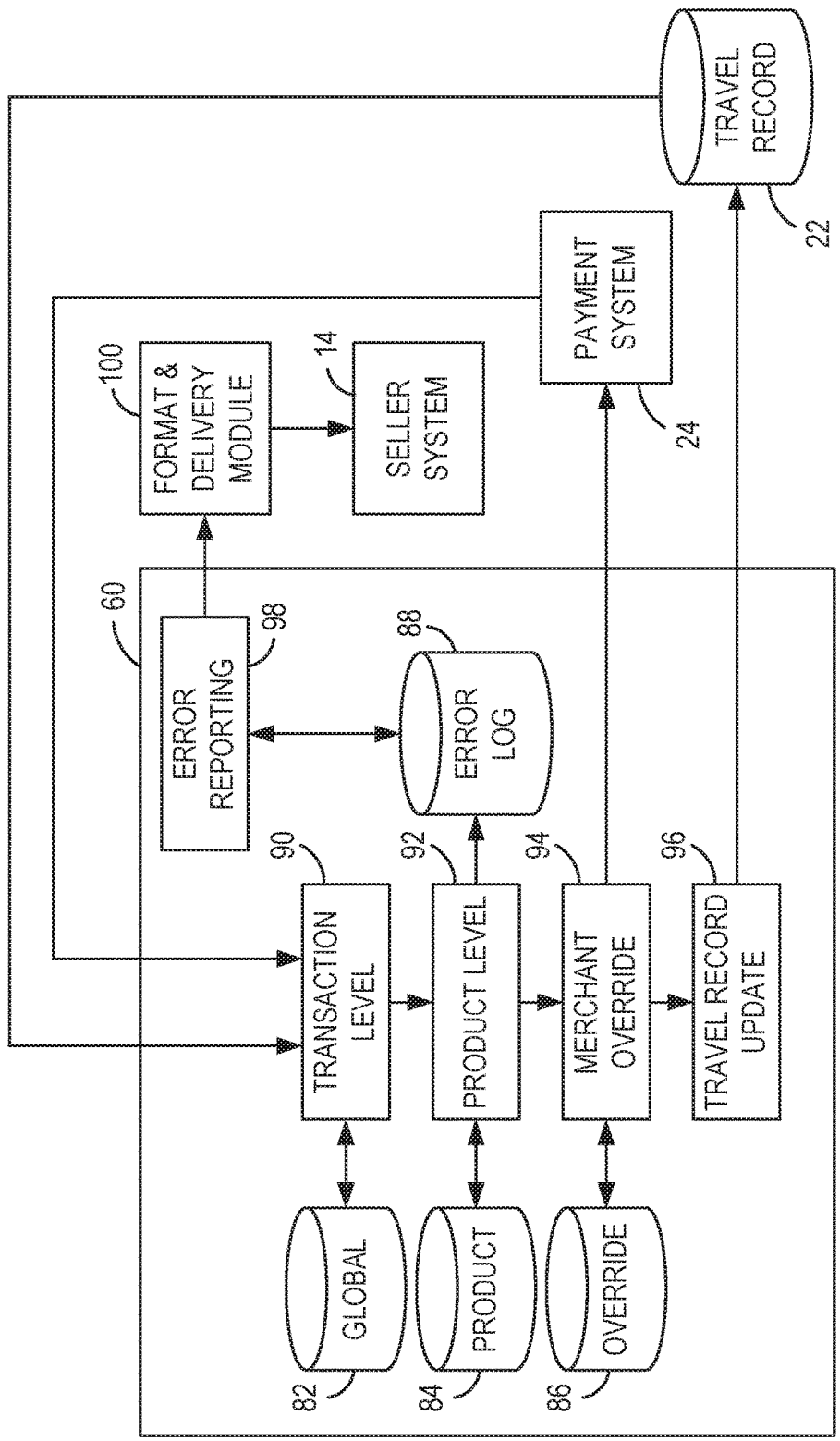
FIG. 4 is a diagrammatic view of the merchant determination module of FIG. 3.

Referring now to FIG. 4, the merchant determination module 60 is depicted in more detail. The merchant determination module 60 may be configured to manage multiple merchants for each transaction to purchase an itinerary. To this end, the merchant determination module 60 may select the merchant for each travel product in the itinerary based on an effect the merchant selection has on a financial parameter, such as an amount of the total sale which is credited to the seller. The merchant selection for a specific product in a specific itinerary may be based on business rules of the supplier, business rules of the seller, one or more characteristics of the product, and/or the context of the transaction. In particular, the business rules of the seller may determine the merchant based on parameters specific to the seller managing the transaction. For example, specific business rules may be defined by the seller to maintain compatibility with one or more commercial agreements with a supplier, and/or a business policy of the seller. The merchant determination module 60 may ensure that the seller is only accountable for the amount of the transaction for which the seller is actually providing a service. This may allow the seller to avoid inappropriate taxation, and allow suppliers to have more visibility on fare policies.

The merchant determination module 60 may include a global rules database 82, a product rules database 84, an override rules database 86, and an error log database 88. To determine the merchant for a product based on the rules stored in these databases, the merchant determination module 60 may include a transaction level process 90, a product level process 92, and a merchant override process 94 that work cooperatively to determine the merchant for each product in view of the merchant selection rules in the rules databases and the context of the transaction. Once the merchants have been determined, a travel record update process 96 may update the corresponding travel record in the travel record database 22 to indicate the merchant for each product in the itinerary.

An error reporting process 98 may operate asynchronously to generate failure reports based on error records stored in the error log database 88. The product level process 92 may store an error record in the error log database 88, for example, in response to the product level process 92 being unable to determine a merchant for a product in the itinerary based on a global rule or product rule.

The merchant determination module 60 may retrieve data from and store data to external systems, such as the travel record database 22 and/or the payment system 24. For example, the transaction level process 90 may receive data identifying one or more forms of payment being used for the transaction from the payment system 24, and data defining the products and itinerary from the travel record database 22. The travel record update process 96 may in turn transmit data to the travel record database 22 defining the merchant for each product in the itinerary. The error reporting process 98 may also transmit error reports to a formatting and delivery module 100, which may format and deliver the error reports to a predefined network address, such as an email address, in a user readable format.

The global rules database 82 may contain parameters used to identify rules for selecting a merchant that are applied to all the products in the itinerary, or rules that are only a subset of the products in the itinerary. That is, the rules stored in the global rules database 82 may include rules that define merchant decision parameters which are not specific to a single product, but rather apply to the whole itinerary or to a subset of the itinerary. For example, global rules may select the merchant based on an amount of time between when the itinerary is being booked and the earliest use date of a product in the itinerary, e.g., the departure date for an outbound flight. This type of rule may select the seller as the merchant if the amount of time in question is below a minimum allowable time $T_{MIN}$. Rules that select the merchant as the seller if the amount of time until use is below $T_{MIN}$ may be configured to enable the seller to guarantee a booking by taking responsibility for the sale, e.g., when the booking is being requested shortly before departure of a flight. The global rules may also define a type of product to which the rule applies. For example, the above rule that selects the seller as the merchant may only apply to pre-paid products.

Additional examples of global rules may include a rule that selects the seller as the merchant for all products of the itinerary in a predefined category in response to the number of merchants for the itinerary exceeding a threshold $M_{MAX}$. Another exemplary global rule may select the seller as the merchant for all products of the itinerary having a cancellation penalty if the number cancellation penalties exceeds a threshold $P_{MAX}$. Yet another exemplary global rule may select the seller as the merchant for all pre-paid products if the form of payment is in points or by an online payment system, such as PAYPAL®.

Other rules may determine that conventional forms of payment are made directly to the supplier, which may require the supplier be the merchant. In contrast, other forms of payment, such as gift cards or fidelity programs, may be made to the seller, which may require the seller to be the merchant. Table 1 provides an example of how the above rules may be organized in the global rules database 82.

The product rules database 84 may store rules that identify a default merchant for specific products according to the characteristics of the product. These rules may be specific to each type of product and to the characteristics of the product, and may identify the merchant on a per product basis depending on the characteristics of the product. The parameters used by the product rules database 84 to identify the merchant may be defined based on commercial agreements of the seller. Exemplary parameters that could be used to select a merchant using product rules includes the product type (e.g., air, hotel, attraction, etc. . . . ), payment model (e.g., pre-paid or post-paid), the form of payment (credit card, seller fidelity card, online payment, etc. . . . ), the identity of the issuing bank (for forms of payment involving a credit card), whether a fare is marked-up or marked-down by the seller, the identity of the provider, the identity of the supplier, time constraints (e.g., a minimum time in advance of use the product must be ticketed), or a point of sale.

TABLE 1

GLOBAL RULES

|  | $T_{MIN}$ | $M_{MAX}$ | $P_{MAX}$ | FOP |
|---|---|---|---|---|
| Threshold/Type Products to Override | 4 Prepaid | 3 Hotel, Car Rental, Attraction, Cruise | 1 Products With a Cancellation Penalty | Points, Online Prepaid |

Each product rule may be based on different combinations of parameters, and does not necessarily require that each parameter have a particular value. This allows the product rules database 84 to have some rules that apply to large categories of products, and other rules that define the merchant for a narrower set of products, such as a specific product or products from a specific supplier or provider. Table 2 depicts two exemplary rules that may be defined based on the previously illustrated parameters. The top row of Table 3 depicts a relatively narrow rule that selects the supplier as the merchant for pre-paid flights paid for using VISA® (form of payment code CCVI) provided and supplied by Transportes Aéreos Meridionais (IATA code JJ) with a point of sale of Brazil (BR). The rule defined by the lower row of Table 2 may define a relatively broader rule, and selects the supplier as the merchant for any hotel supplied by Ibis with a point of sale in Brazil.

The rules in the global rules database 82 and product rules database 84 may be based on groupings of parameters that are applicable to all products which can be included in an itinerary. The merchant identified by sequential application of the transaction level process 90 and product level process 92 may provide a baseline merchant assignment that may be overridden by the merchant override process 94. The override rules database 86 may contain rules that identify specific use cases at a product level in which the baseline merchant selection should be overridden. For example, the seller may want to define a different merchant for each of two products of the same type according to parameters that are strictly related to the nature of the product.

TABLE 2

PRODUCT RULES

| Product Type | Payment Model | FOP Code | Issuing Bank | Marked-up/Marked-down Status | Prov. | Sup. | Min. Days Adv. | POS | Merchant |
|---|---|---|---|---|---|---|---|---|---|
| Air | Pre-Paid | CCVI |  |  | JJ | JJ |  | BR | Supplier |
| Hotel |  |  |  |  |  | IBIS |  | BR | Supplier |

As a specific example, the seller may define rules in the override rules database 86 that cause the merchant override process 94 to determine the merchant for air products differently for domestic flights as compared to international flights. As another example, the seller may be required to select different merchants based on commercial distribution agreements the seller has with specific suppliers or providers. Thus, the override rules may provide a third layer of rules that can identify cases specific to each product category in which the merchant should be overridden to a value different than the one identified by the transaction and product level rules.

Table 3 and Table 4 depict examples of the above rules for air and hotel products. Applying the rules depicted in Table 3, a domestic flight on Transportes Aéreos Meridionais (Provider Code=JJ) with an origin and destination in Brazil may be assigned the seller as the merchant. In contrast, an international flight on Transportes Aéreos Meridionais with an origin in Brazil and a destination in Europe may be assigned the supplier as the merchant.

TABLE 3

AIR PRODUCT OVERRIDE RULES

| Airline | Booking Class | Origin | Destination | Merchant |
|---------|---------------|--------|-------------|----------|
| JJ      |               | BR     | BR          | Seller   |
| JJ      |               | BR     | EU          | Supplier |

TABLE 4

HOTEL PRODUCT OVERRIDE RULES

| Hotel | Chain  | Location | Merchant |
|-------|--------|----------|----------|
|       | HILTON |          | Supplier |
|       | HILTON | Brazil   | Seller   |

Applying the rules depicted in Table 4, a room in a HILTON® hotel in a non-specific location may have the supplier assigned as the merchant, while a room in a HILTON® hotel located in Brazil may have the seller assigned as the merchant. These merchant determinations may be made without regard to the merchant determined by the transaction level process 90 or product level process 92. That is, merchant assignment decisions made by the transaction level process 90 or product level process 92 may be overridden by the merchant override process 94.

Figure 5:
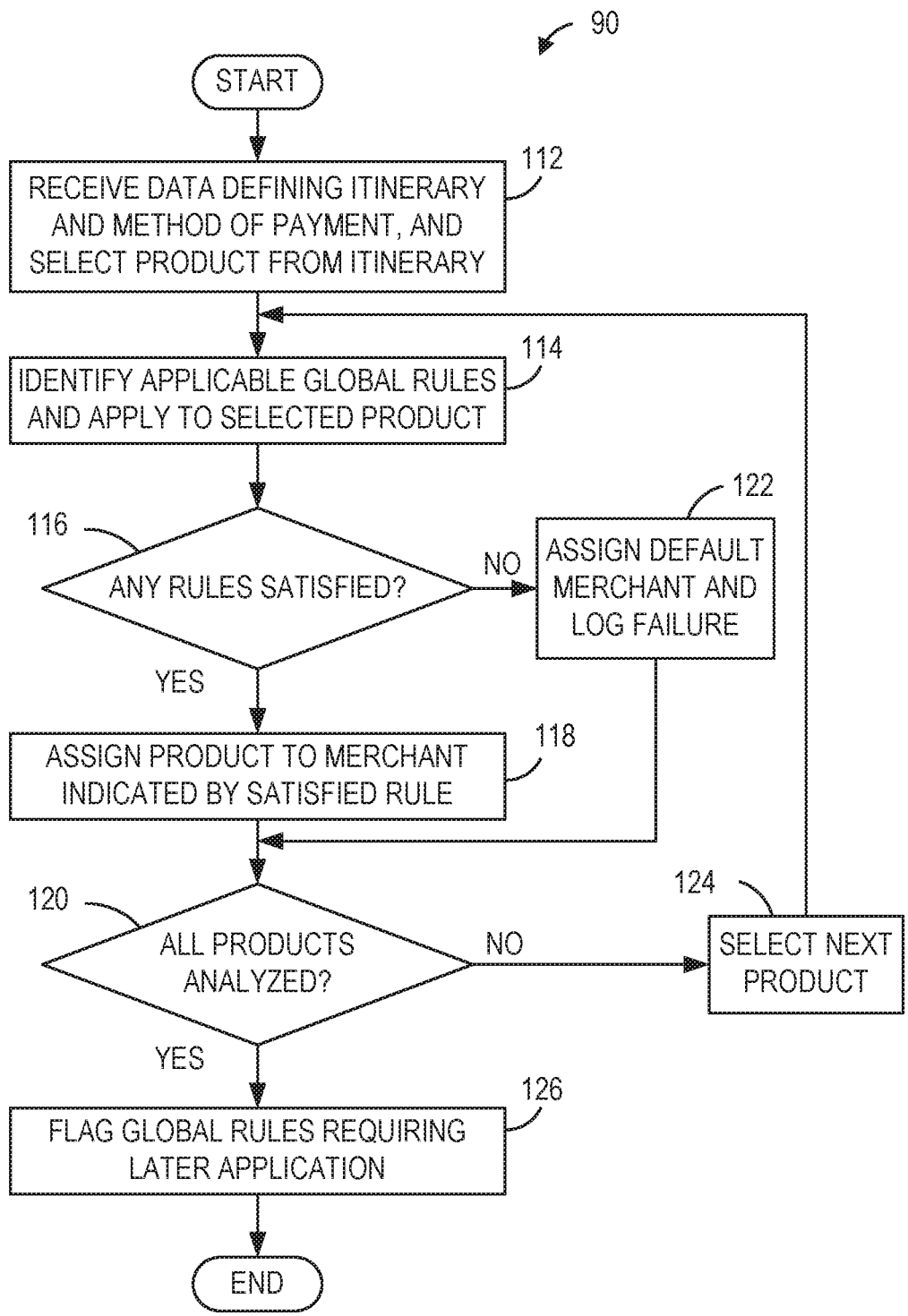
FIG. 5 is a flow chart of a transaction level merchant determination process that may be implemented by the merchant determination module of FIG. 4.

FIG. 5 depicts a flowchart of an embodiment of the transaction level process 90 that may be implemented by the merchant determination module 60. The transaction level process 90 may assign a merchant to each product in the itinerary defined by the travel record being processed. In block 112, the transaction level process 90 may receive data defining the itinerary and one or more forms of payment. This data may be received, for example, from the travel record database 22 and/or the payment system 24. Data received from the travel record database 22 may include reservation and pricing information for each product in the itinerary, which may be extracted from the travel record. The payment data may define one or more forms of payment offered by the buyer to pay for the transaction, e.g., a credit card account, online payment account, redeemable points, voucher, or other suitable form of payment. In response to receiving the data, the transaction level process 90 may select a product from the itinerary and proceed to block 114.

In block 114, the transaction level process 90 may identify a set of one or more global rules in the global rules database 82 that are applicable to the itinerary, and apply these rules to the selected product. The rules that are applicable may depend on one or more characteristics of the itinerary or the context of the transaction, such as the identity of the seller, a point of origin of the transaction, or any other suitable rule selection parameter. The transaction level process 90 may apply the applicable global rules to the selected product in view of the transaction context. Applying the global rules may comprise determining which rule or rules have input parameters that are satisfied by the product data, transaction context data, and/or form of payment data for the product being analyzed.

If the transaction level process 90 identifies a rule having input parameters that are satisfied for the selected product ("YES" branch of decision block 116), the transaction level process 90 may proceed to block 118 and assign the merchant defined by the satisfied rule (e.g., the seller or supplier) to the corresponding product of the itinerary and proceed to block 120. If the transaction level process 90 does not identify a rule having input parameters that are satisfied for the selected product ("NO" branch of decision block 118), the transaction level process 90 may proceed to block 122 and assign a default merchant (e.g., the seller). The failure to identify the merchant for the product based on a global rule may also be logged in the error log database 88. Logging the failure in the error log database 88 may facilitate creation of updated global rules that are applicable to the products and contexts which are not identified by the current global rules. The transaction level process 90 may then proceed to block 120.

In block 120, the transaction level process 90 may determine if all products in the itinerary have been analyzed. If all the products have not been analyzed ("NO" branch of decision block 120), the transaction level process 90 may proceed to block 124, select the next product to be analyzed, and return to block 114. If all the products have been analyzed ("YES" branch of decision block 120), the global level process may proceed to block 126.

In some cases, there may be global rules that cannot be applied until after the product level process 92. For example, a rule having a input parameter that includes the number of merchants for the itinerary may need to be applied after the merchants have been determined using both the global rules and the product rules. These global rules may be flagged by the transaction level process 90 in block 126 for application after the missing global rule input parameters have been determined.

Figure 6:
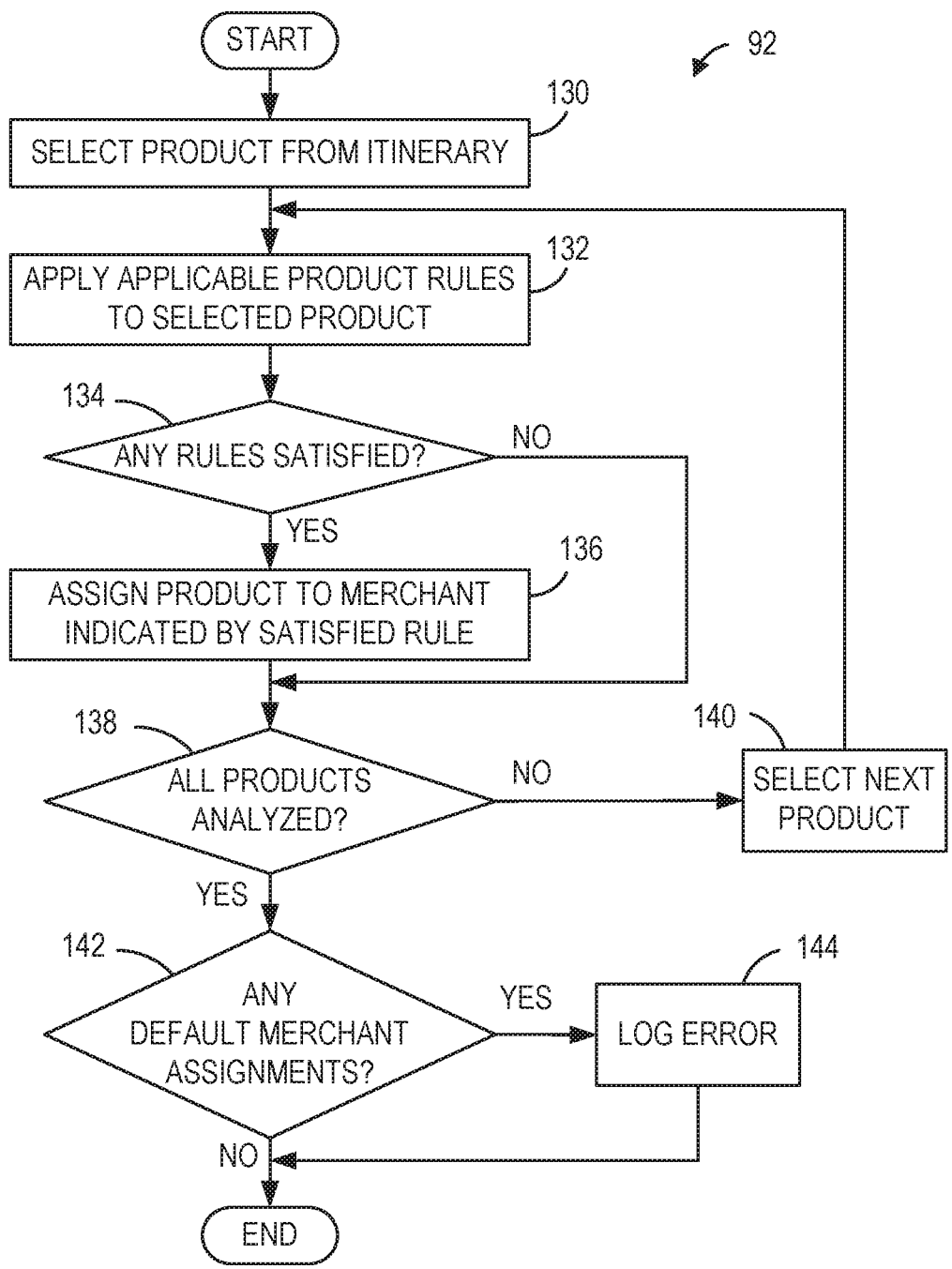
FIG. 6 is a flow-chart of a product level merchant determination process that may be implemented by the merchant determination module of FIG. 4.

FIG. 6 depicts a flowchart of an embodiment of the product level process 92 that may be implemented by the merchant determination module 60. In block 130, the product level process 92 may select a product from the itinerary and proceed to block 132. In block 132, the product level process 92 may determine which product rules in the product rules database 84, if any, are applicable to the selected product. The rules that are applicable may depend on one or more characteristics of the product, the identity of the seller, the identity of the provider, the identity of the supplier, the type of product, or any other product rules parameter. The product rules may be configured, for example, to ensure that the transaction adheres to any applicable commercial agreements between the seller and the supplier.

Once the product rules have been identified, the product level process 92 may apply the applicable product rules to the selected product. Applying the applicable product rules may comprise determining whether the applicable rules have input parameters that are satisfied by the product data, transaction context data, and/or form of payment data for the product being analyzed. If the product level process 92 identifies an applicable rule having input parameters that are satisfied ("YES" branch of decision block 134), the product level process 92 may proceed to block 136 and assign the merchant defined by the satisfied rule (e.g., the seller or supplier) to the corresponding product of the itinerary and proceed to block 138. If the merchant assigned by the product rule is different than the merchant assigned by the transaction level process 90, the merchant assigned by the product rule may replace the merchant assigned by transaction level process 90.

If the product level process 92 does not identify a rule having input parameters that are satisfied ("NO" branch of decision block 134), the product level process 92 may leave the assigned merchant unchanged, and proceed to block 138. In block 138, the product level process 92 may determine if all the products in the itinerary have been analyzed. If all the products have not been analyzed ("NO" branch of decision block 138), the transaction level process 90 my proceed to block 140, select the next product to be analyzed, and return to block 132. If all the products have been analyzed ("YES" branch of decision block 138), the product level process 92 may proceed to block 142.

In block 142, the product level process 92 may determine if the merchant assigned to any of the products was not selected based on a global or product rule. That is, the product level process 92 may determine if a default merchant is assigned to any products because there were no global or product rules in the rules databases applicable to the product. If one or more products have assigned merchants that were assigned by default ("YES" branch of decision block 142), the product level process 92 may proceed to block 144 and log the conditions that led to default assignment in the error log database 88. If all the products were assigned a merchant by application of at least one rule to the product ("NO" branch of decision block 142), the product level process 92 may end.

Figure 7:
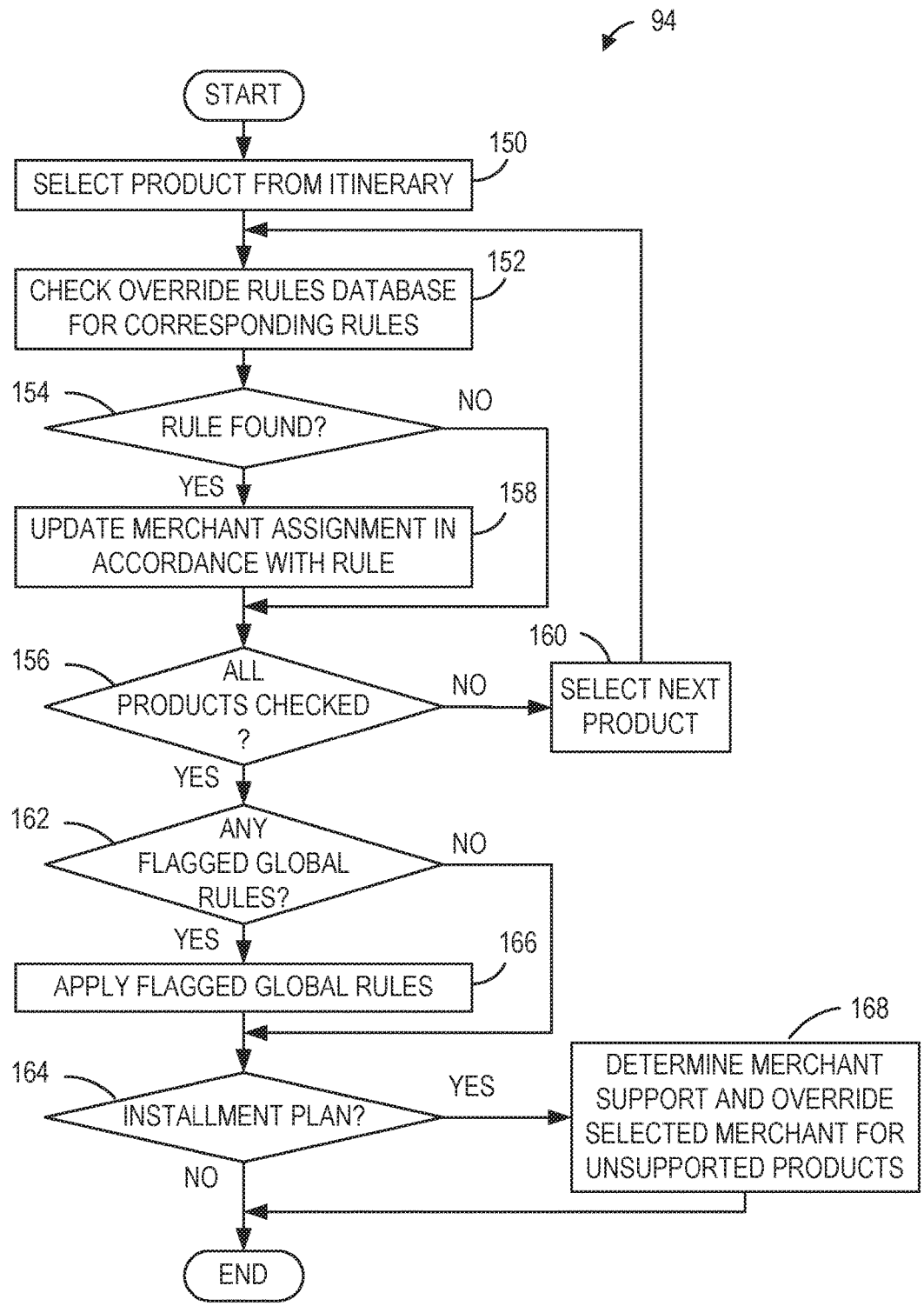
FIG. 7 is a flow-chart of a merchant override process that may be implemented by the merchant determination module of FIG. 4.

FIG. 7 depicts a flowchart of an embodiment of the merchant override process 94 that may be implemented by the merchant determination module 60. In block 150, the merchant override process 94 may select a product from the itinerary and proceed to block 156. In block 156, the merchant override process 94 may check the override rules database 86 for rules corresponding to the product. If a corresponding rule is not found in the override rules database 86 ("NO" branch of decision block 154), the merchant override process 94 may proceed to block 156 without changing the assigned merchant for the product. If the merchant override process 94 identifies a rule corresponding to the product in the override rules database 86 ("YES" branch of decision block 154), the merchant override process 94 may proceed to block 158 and update the assigned merchant for the product in accordance with the override rule.

In block 156, the merchant override process 94 may determine if override rules have been checked for all of the products in the itinerary. If all of the products have not been checked ("NO" branch of decision block 156), the merchant override process 94 may proceed to block 160, select the next product, and return to block 152. If all of the products in the itinerary have been checked ("YES" branch of decision block 156), the process may proceed to block 162.

In block 162, the merchant override process 94 may determine if there are any global level rules that were flagged for later application by the transaction level process 90. If no global rules were flagged for later application ("NO" branch of decision block 162), the merchant override process 94 may proceed to block 164. If global rules were flagged for later application ("YES" branch of decision block 162), the merchant override process 94 may proceed to block 166, apply the flagged global rules to the applicable products, and proceed to block 164. Applicable products may include products that have a merchant which was assigned by a global level rule. That is, in an embodiment of the invention, the merchant override process 94 may only apply the flagged global rules to products that were not assigned a merchant based on a product rule or merchant override rule.

By way of example, if one or more products were flagged for being subject to the exemplary global rule regarding the maximum number of merchants depicted by Table 1, the merchant override process 94 may apply the rule by determining the number of different merchants for the itinerary. Per the rule, the number of different merchants may be determined based on the merchants for pre-paid products only. The merchant override process 94 may count a single merchant once if that merchant is the same for several products. If the resulting number of merchants is above the threshold established by the rule (e.g., three), than the assigned merchant may be overridden by assigning the seller as the merchant for the product in question. The products to which the rule applies may also be defined by the rule. For example, for the rule depicted by Table 1, only Hotel, Car Rental, Attraction, and Cruise products are subject to the maximum number of merchants restriction $M_{MAX}$.

In block 164, the merchant override process 94 may determine if the buyer has selected a form of payment that includes an installment plan. Installment plans may be provided by the seller or by one or more of the suppliers. If the form of payment does not include an installment plan ("NO" branch of decision block 164), the merchant override process 94 may end. If the form of payment includes an installment plan ("YES" branch of decision block 164), the merchant override process 94 may proceed to block 168.

To ensure that a selected installment plan is supported by the merchant assigned to each product, in block 168, the merchant override process 94 may query the payment system 24 for all installment plans that are supported for the travel record being processed. The merchant override process 94 may then determine, for each product, if the assigned merchant supports the selected installment plan. If the assigned merchant supports the selected installment plan, the merchant may be left unchanged. If the assigned merchant does not support the selected installment plan, the merchant override process 94 may re-assign the product to an alternative merchant (e.g., the supplier if the assigned merchant is the seller, or the seller if the assigned merchant is the supplier) if the alternative merchant supports the selected installment plan.

Once the travel record has been processed by each of the transaction level process 90, the product level process 92, and the merchant override process 94, each product in the itinerary may have an assigned merchant. The travel record update process 96 may then update the travel record in the travel record database 22 to reflect the merchant assignments.

If the global or product rules fail to positively identify a merchant for a product, the product may be assigned a default merchant (e.g., the seller) to allow processing of the transaction to continue. However, reliance on default merchants may indicate an unintended or unexpected interaction between the rules, products, and/or the context of the transaction. To notify sellers of these occurrences, the error reporting process 98 may access the error log database 88 asynchronously and notify the seller of product use scenarios that are not covered by the global rules in the global rules database 82 or the product rules in the product rules database 84.

The error reporting process 98 may be executed on a regular basis, such as in accordance with a user defined time schedule. The error reporting process 98 may retrieve error records generated during processing of transactions from the error log database 88. As described above, the error records may identify products and conditions under which a merchant was not positively identified by the rules. That is, the error records may identify products for which a merchant (e.g., the seller) was assigned merely by default. The error reporting process 98 may aggregate the error records and provide the aggregated error records to the formatting and delivery module 100.

The formatting and delivery module 100 may format the error records into reports, and send the reports to a predefined address, such as an email address, File Transfer Protocol (FTP) address, or Internet Protocol (IP) address provided by the seller. Formatting may be performed based on a template, which may be configured by the recipient of the report to define how the log data should be displayed. The error log database 88 and error reporting process 98 may thereby enable the seller to adjust one or more of the global rules or product rules to cover product use scenarios that triggered creation of the error record.

By way of example, operation of the merchant determination module 60 will now be described using a hypothetical scenario. The scenario includes a traveler booking a trip to Rio De Janeiro on May 19th through a Brazilian online website operated by the seller. The point of sale is Brazil, and the itinerary includes an air product, a hotel product, and an attraction product. The air product is a flight from San Paulo (GRU) to Rio De Janeiro (GIG) on Transportes Aéreos Meridionais, (Provider Code=JJ) that departs on June 19. The hotel product is a room reserved from June 19 to June 21 at Ibis Botafogo. The attraction product is a ticket to visit the Corcovado on June 20. In this hypothetical example, the form of payment selected by the traveler includes a credit card (e.g., VISA®, FOP Code CCVI), with a three payment installment plan having a 1% interest rate.

The above itinerary information may be provided to the merchant determination module 60 from the travel record database 22 and/or the payment system 24. An exemplary data file containing the itinerary data that may be received from the travel record database 22 may be configured as follows:

```
RESERVATION ABC123
FLIGHT JJ GRU GIG 19 JUN
HOTEL IBIS BOTAFOGO 19-21 JUN
TREM DO CORCOVADO TICKET 20 JUN
```

The above described payment information may be provided to the merchant determination module 60 by the payment system 24. An exemplary data file containing the payment data may be configured as follows:

```
CCVI 1234XXXX
INSTALLMENT PLAN 3x1
19 MAY, BRAZIL
```

The transaction level process 90 may retrieve the global rules for the seller from the global rules database 82, which may be represented by the exemplary rules defined by Table 5.

TABLE 5

GLOBAL RULES

| | $T_{MIN}$ | $M_{MAX}$ | $P_{MAX}$ | FOP |
|---|---|---|---|---|
| Threshold/Type Products to Override | 4 Prepaid | 3 Hotel, Car Rental, Attraction, Cruise | 1 Products With a Cancellation Penalty | Points, Online Prepaid |

There are thirty days from the transaction date (May 19) until the earliest use date of any product in the itinerary (the flight departing on June 19th), so the threshold condition defined in column $T_{MIN}$ is not satisfied. The threshold condition in column $M_{MAX}$ cannot be determined until after the number of merchants is known. None of the products in the itinerary have a penalty, so the threshold condition defined in column $P_{MAX}$ is not satisfied. The form of payment is a credit card, so the type condition in column FOP is not satisfied. Because none of the conditions of the rule as satisfied at this stage, the global rules in Table 5 fail to positively identify a merchant for any of the products. However, because the number of merchants is not yet known, the global rule that depends on a maximum number of merchants not exceeding $M_{MAX}$ may be flagged for later application. Thus, at the point where processing of the travel record is passed from the transaction level process 90 to the product level process 92, the merchant has yet to be determined for any of the products in this example.

The product level process 92 may analyze the itinerary at a product level, and may assign a merchant to each product that will provide a baseline for the final merchant decision by the merchant override process 94. To determine the applicable product rules, the product level process 92 may query the product rules database 84 for rules that match the product information received from the travel record database 22. The product rules database 84 may be configured so that each product has a matching rule which identifies a merchant for the product. Table 6 provides an exemplary set of product rules that may be returned by the product rules database 84.

TABLE 6

PRODUCT RULES

| Product Type | FOP Code | Provider | Supplier | Country POS | Merchant |
|---|---|---|---|---|---|
| Air | | JJ | JJ | | Provider |
| Hotel | CCVI | | IBIS | BR | Provider |

In the present example, comparing the product data to the rules in Table 6, it can be seen that the air product matches the rule defined in the top row of Table 2, as the flight is being provided by Transportes Aéreos Meridionais (Provider Code=JJ). The hotel product can be seen to match the rule defined by the bottom row of Table 1, as the form of payment is VISA® (FOP Code CCVI), the provider is Ibis, and the point of sale is Brazil. Thus, the supplier (Transportes Aéreos Meridionais) is assigned as the merchant for the air product, and the supplier (Ibis) is assigned as the merchant for the hotel. However, because no product rules match the attraction, the base merchant for the attraction is assigned to the default merchant, e.g., the seller.

Because the merchant for one of the products was not determined by either a global rule or a merchant rule, the product level process 92 may generate an error record in the error log database 88. The error record may inform the seller that no rules are defined in either the global rules database 82 or the product rules database 84 for the attraction product. The error record may store all relevant data for the transaction, such as an identity of the travel record (e.g., a record locator) as well as information related to the attraction product. In response to the product level process 92 completing its processing of the travel record, the merchant determination module 60 may pass processing of the travel record from the product level process 92 to the merchant override process 94.

At the time the travel record is passed to the merchant override process 94, the base merchant assigned to the air product may be Transportes Aéreos Meridionais, the base merchant assigned to the hotel may be Ibis, and the default merchant assigned to the attraction may be the seller. The merchant override process 94 may begin by retrieving the merchant override rules for air products, and merchant override rules for hotel products from the override rules database 86. Exemplary rules use with this example are illustrated in Tables 7 and 8.

TABLE 7

AIR PRODUCT OVERRIDE RULES

| Airline | Origin | Destination | Merchant |
|---|---|---|---|
| JJ | BR | NYC | Seller |
| JJ | BR | EU | Seller |

TABLE 8

HOTEL PRODUCT OVERRIDE RULES

| Hotel | Chain | Location | Merchant |
|---|---|---|---|
| | HILTON | AR | Seller |
| | IBIS | BR | Seller |

The carrier (e.g., Transportes Aéreos Meridionais, Provider Code=JJ) and origin (e.g., San Palo) of the air product matches the corresponding carrier and origin conditions in both rules of Table 7. However, the destination of the air product (Rio De Janeiro) does not match the destination condition in the rule (New York City). Because none of the override rules match the air product, the previously assigned merchant, Transportes Aéreos Meridionais, is maintained. The chain and location of the hotel product matches the rule defined by the bottom row of Table 8. This rule may due, for example, to a commercial agreement with Ibis that requires the seller to be the merchant for Ibis hotels in Brazil. Because the product matches the merchant override rule, the merchant for the hotel product is switched from Ibis to the seller.

In response to completing the analysis of merchant assignments for each product in the itinerary based on the merchant override rules in the override rules database 86, the merchant override process 94 may check for compliance with flagged global rules. In the present exemplary case, there is a flagged rule that depends on the maximum number of merchants that could result in a possible override. Thus, the merchant override process 94 may determine the number of merchants and apply the flagged rule. Because only two merchants are currently assigned as merchants to products in the itinerary, namely Transportes Aéreos Meridionais and the seller, and $M_{MAX}$ for the flagged global rule is three, the flagged global rule does not override the current assignments.

Because the buyer has requested a form of payment that includes an installment plan, the merchant override process 94 may further determine if this form of payment requires any additional overrides of the assigned merchants. To this end, the merchant override process 94 may query the payment system 24 for a list of available installment plans for the travel record. In response to the query, the payment system 24 may return a data file containing the available installment plans. An exemplary response received from the payment system 24 may be configured as follows:

JJ → 1x0%, 2x0%, 3x1%, 10x4%
OLTA → 1x0%, 2x0%, 3x1%, 4x2%, 10x5%, 12x5%

Because the only remaining merchants are the supplier of the air product (Provider Code JJ) and the seller (e.g., an online travel agency or OLTA), and the requested installment plan (e.g., 3x1%) is supported by each merchant, there is no need to change the merchant assignments for any of the products. Having applied all the applicable rules, the merchant override process 94 may end, and the merchant determination module 60 proceed to execute the travel record update process 96. The travel record update process 96 may format the assigned merchant data and transmit an update request to the travel record database 22. The update request may instruct the travel record database 22 to update the travel record to indicate the merchant assigned to each product.

At a designated time after the merchant determination, the error reporting process 98 may provide an error report to the seller system detailing scenarios where the merchant determination module 60 failed to identify a base merchant. To this end, the error reporting process 98 may access the error log database and retrieve error records that have yet to be reported (e.g., the error record for the attraction product). This data may be formatted in accordance with previously defined template by the formatting and delivery module 26, and sent as an email to the requested recipient. The error log database 88 may be purged after each itinerary is processed so that only errors for the current travel record are sent out after processing by the merchant determination module 60 is completed.

Form of Payment Determination

Depending on the merchant decision, payments for booking a reservation may require different forms of payment to settle accounts with the supplier and the seller. For each product in the itinerary, two payment flows are possible. The buyer may pay the seller who in turn pays the supplier of the product, or the buyer may pay the supplier of the product directly. In cases where the payment is routed through the seller, the amount paid to the seller may be different than the amount the seller pays the supplier. This may be the case, for example, if the seller has marked-up or marked-down to the price of the product. A form of payment used to settle an account with the supplier may be referred to as the supplier form of payment. A form of payment used to settle an account with the seller may be referred to as the seller form of payment. As described below, the form of payment module 62 may be configured to identify the appropriate forms of payment to be used for settling accounts between the buyer and seller, the seller and supplier, and the buyer and supplier. Data identifying the form of payment to be used with each product in the itinerary defined by the travel record may be stored in a data field and associated with the corresponding product in the travel record.

A conventional Passenger Name Record (PNR) may be limited with regard to the types and number of forms of payment that can be tracked. For example, a PNR may be limited to only the form of payment used by the buyer or the form of payment used by the seller. In the case of the seller, the form of payment may have to be entered as a proxy (e.g., CASH), and the actual payments tracked off-line. The form of payment module 62 may address this problem by tracking all forms of payment related to booking the itinerary in the travel record, thereby enabling an automatic end-to-end online transaction processing between the buyer, the seller, and the supplier.

The form of payment module 62 may include processes that enable automatic payments, secure transactions, and error recovery. These processes may add forms of payment used by the seller to the corresponding travel record, with payments from the buyer directly to the supplier being handled by the supplier system. Payments made by the buyer to the seller by credit card may be more susceptible to fraud and/or errors as compared to other forms of payment due to theft of the card number or data entry errors by agents of the seller.

The form of payment module 62 may enable forms of payment to be defined in the travel record for payments from the buyer to the seller and from the seller to the supplier. The form of payment module 62 may thereby enable forms of payment from the seller to the supplier to be determined by querying the travel record. To automate payments from the seller to the supplier in cases where multiple forms of payment are used by the seller, the form of payment may be determined based on payment rules maintained in a database of payment rules. These payment rules may be defined by the seller, and may depend on parameters such as the market in which the product is offered, the type of product, or any other suitable parameter.

Figure 8:
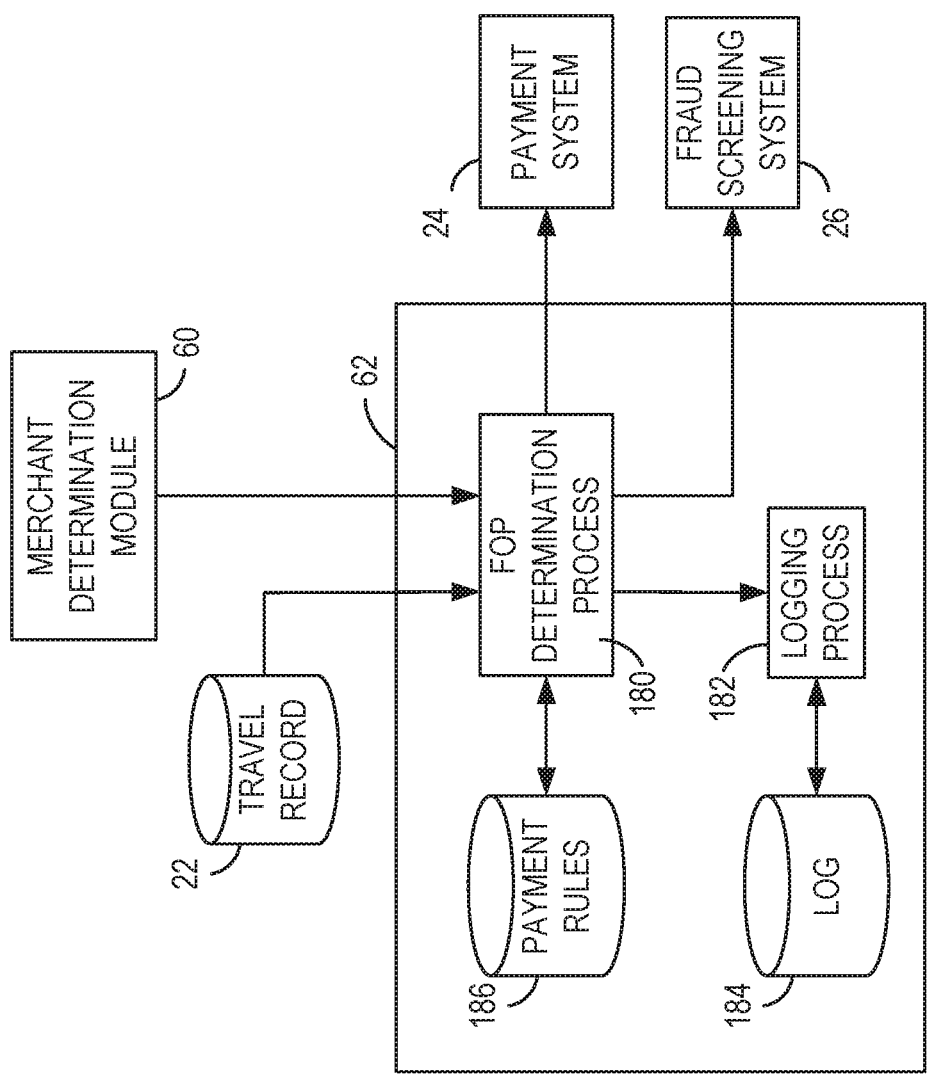
FIG. 8 is a diagrammatic view of the form of payment module of FIG. 3.

Referring now to FIG. 8, the form of payment module 62 may include a form of payment determination process 180, a logging process 182 that logs processing of the transaction by the form of payment determination process 180 in a log database 184, and a payment rules database 186. The determination process 180 may retrieve product, point of sale, and merchant data from the travel record by querying the travel record database 22. The determination process 180 may also receive data from the merchant determination module 60, and communicate with the payment system 24 and the fraud screening system 26. The determination process 180 may also retrieve or otherwise access contextual data of the transaction, such as date and time data. The determination process 180 may process this data to determine the form of payment used to pay each supplier based on rules governing forms of payment retrieved from the payment rules database 186. The payment rules database 186 may be configured so that the seller can define the payment rules in the payment rules database 186.

Once the forms of payment have been determined, the determination process 180 may add data to the travel record that identifies the supplier form of payment for each product in the travel record. The determination process 180 may also add data to the travel record that identifies the seller form of payment. During the process of defining the forms of payment, the determination process 180 may push data to the logging process 182, which may generate log records in the log database 184. The determination process 180 may also interact with other modules to update the travel record and/or request a fraud analysis.

The data received from the determination process 180 may relate to events or progress in determining the form of payment for a product in the itinerary. In response to receiving a request to generate a record in the log database 184, the logging process 182 may generate the record and store information defining an event in the log database 184. The logging process 182 may transmit a reply to the determination process 180 either acknowledging successful generation of the record, or informing the determination process 180 of a failure to generate the record. In the event of a failure of the logging process 182 to generate the record, the determination process 180 may, for example, retransmit the request. If the request to the logging process 182 is to generate an error log, the logging process 182 may transmit a reply to the determination process 180 in the form of an EDIFACT or XML reply that indicates the type of error which was logged in the log database 184.

Figure 9:
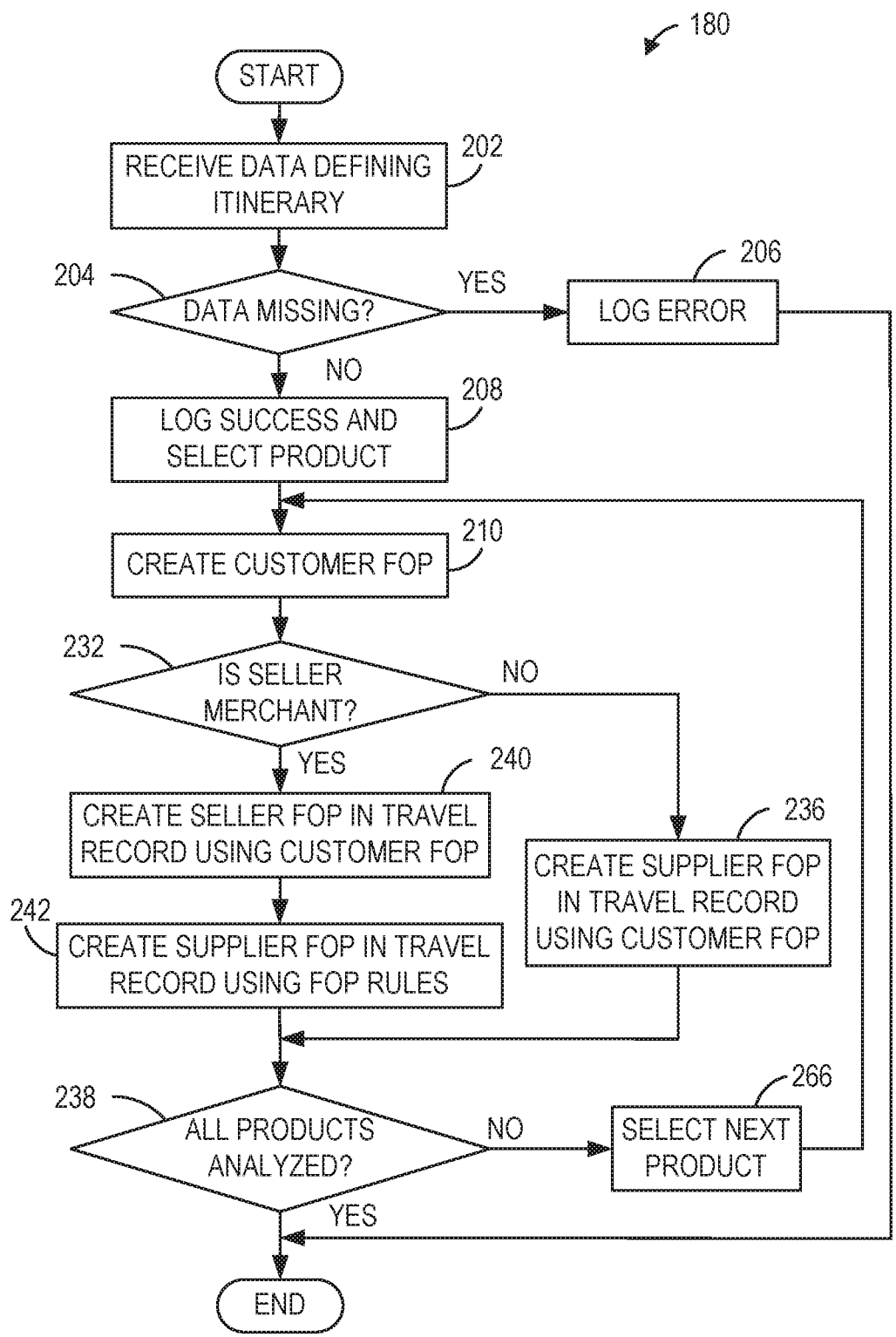
FIG. 9 is a flow chart of a form of payment determination process that may be implemented by the form of payment module of FIG. 8.

FIG. 9 depicts a flowchart of an embodiment of the determination process 180 that may be implemented by the form of payment module 62. In block 202, the determination process 180 may retrieve data defining the itinerary that is being purchased. The determination process 180 may retrieve this data, for example, from the travel record database 22 in response to an EDIFACT or XML request to determine the form of payment for a particular product of the itinerary or the itinerary as a whole. The product information retrieved from travel record may include data identifying the merchant assigned to the product by the merchant determination module 60. The data retrieved from the travel record may also include contextual information for the transaction, such as the point of sale and the date and time of the sale.

In block 204, the determination process 180 may determine if any data necessary to determine the forms of payment used to purchase the products in the itinerary is missing. If any data is missing ("YES" branch of decision block 204), the determination process 180 may proceed to block 206 and request the logging process 182 generate an error record in the log database 184. The form of payment module 62 may then terminate the determination process 180 for the itinerary in question. The request to generate the error record may identify the missing data type so that the logging process 182 can include this information in the error record.

If none of the data necessary to determine the form of payment is missing ("NO" branch of decision block 204), the determination process 180 may proceed to block 208. In block 208, the determination process 180 may request the logging process 182 generate a record in the log database 184 indicating the data necessary to determine the form of payments for the products in the itinerary has been retrieved. The determination process 180 may then select a product to analyze from the itinerary and proceed to block 210.

Figure 10:
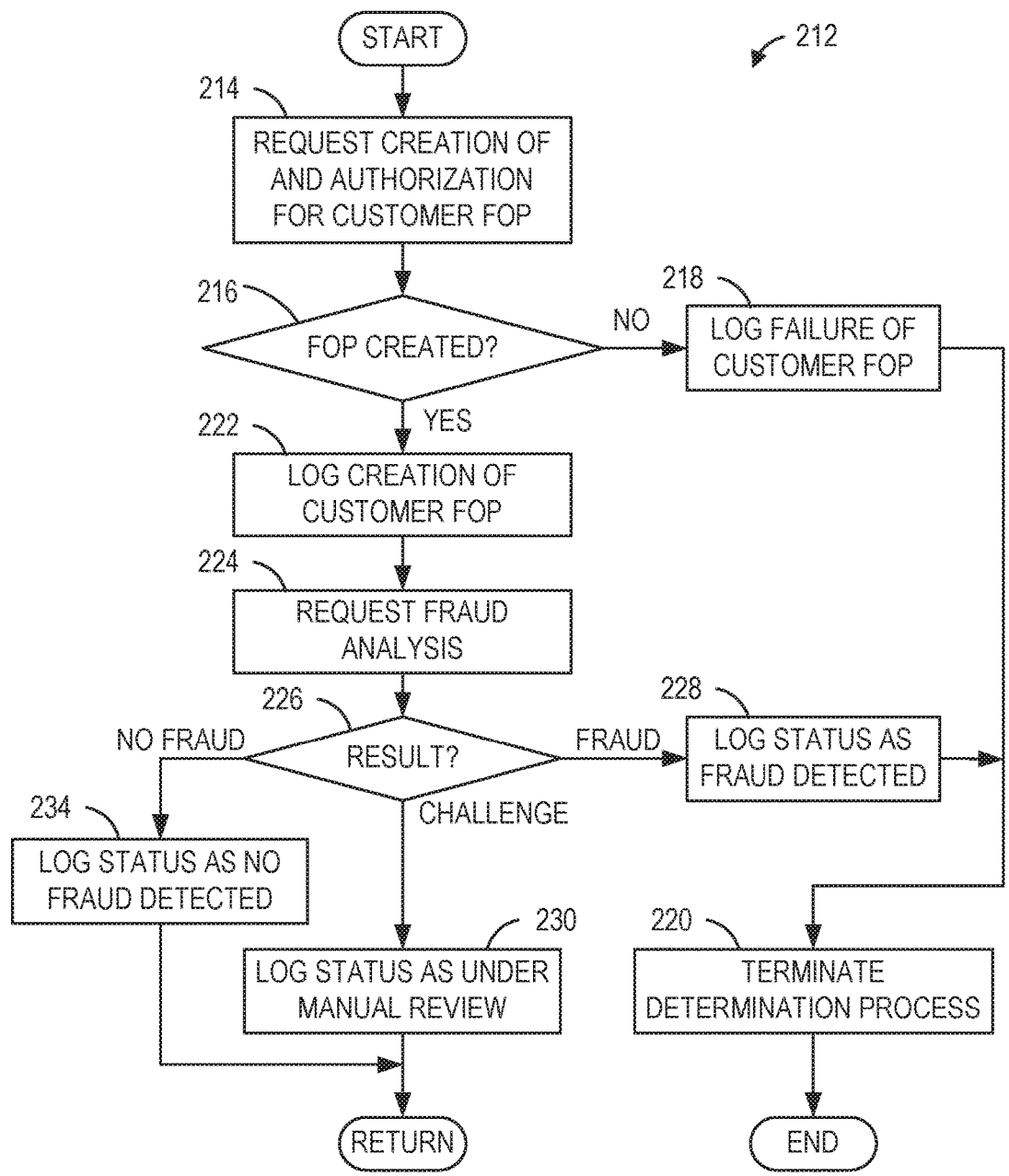
FIG. 10 is a flow chart of a sub-process that may be implemented by the form of payment determination process of FIG. 9.

Referring now to FIG. 10, a sub-process 212 is depicted that may be executed by the determination process 180 in block 210 to create the customer form of payment. In block 214 of sub-process 212, the sub-process 212 may request creation of a customer form of payment data field in the travel record. Creating the customer form of payment may also include obtaining authorization for the customer form of payment. The customer form of payment may be determined by querying the payment system 24 for form of payment information if the supplier is the merchant, or may be determined from data in the initial request to book the itinerary if the seller is the merchant. In either case, in response to determining the customer form of payment, data defining the customer form of payment for the selected product may be stored in the travel record. Obtaining authorization of the customer form of payment may include transmitting an authorization request to, and receiving authorization from, the issuing bank system.

If sub-process 212 is unable to create the customer form of payment in the travel record ("NO" branch of decision block 216), the sub-process 212 may proceed to block 218. In block 218, the sub-process 212 may request the logging process 182 generate an error record in the log database indicating a failure to create the customer form of payment for the selected product. The sub-process 212 may then proceed to block 220 and terminate the determination process 180. If the sub-process 212 successfully creates the customer form of payment in the travel record ("YES" branch of decision block 216), the sub-process 212 may proceed to block 222.

In block 222, the sub-process 212 may request the logging process 182 generate a record in the log database 184 indicating that the form of payment creation for the selected product was successfully added to the travel record. The sub-process 212 may then proceed to block 224 and request a fraud analysis on the customer form of payment. The sub-process 212 may request the fraud analysis by, for example, querying the fraud screening system 26.

If the reply to the fraud analysis request indicates the customer form of payment is fraudulent ("FRAUD" branch of decision block 226), the sub-process 212 may proceed to block 228. In block 228, the sub-process 212 may request the logging process 182 generate an error record in the log database indicating that fraud was detected for the customer form of payment. The sub-process 212 may then proceed to block 220 and terminate the determination process 180.

If the reply to the fraud analysis request indicates the customer form of payment is being subjected to a more rigorous security check, such as a manual review ("CHALLENGE" branch of decision block 226), the sub-process 212 may proceed to block 230. In block 230, the sub-process 212 may request the logging process 182 generate a log record indicating that the security check is being performed on the customer form of payment. The sub-process 212 may then return to the determination process 180.

If the reply to the fraud analysis request indicates the customer form of payment does not appear to be fraudulent ("NO FRAUD" branch of decision block 226), the sub-process 212 may proceed to block 234. In block 234, the sub-process 212 may request the logging process 182 generate a log record indicating the customer form of payment does not appear to be fraudulent. The sub-process 212 may then return to the determination process 180.

Referring again to FIG. 9, in block 232 of the determination process 180, the determination process 180 may determine if the seller is the merchant for the selected product. If the seller is not the merchant ("NO" branch of decision block 232), the determination process 180 may proceed to block 236. In block 236, the determination process 180 may create the supplier form of payment in the travel record using the customer form of payment. The determination process 180 may create the supplier form of payment in the travel record by, for example, transmitting a request to the travel record database 22 requesting the travel record database 22 add a data field defining the supplier form of payment for the product to the travel record. Once the supplier form of payment has been created in the travel record, the determination process 180 may proceed to block 238

If the merchant for the selected product is the seller ("YES" branch of decision block 232), the determination process 180 may proceed to block 240. In block 240, the determination process 180 may create a seller form of payment in the travel record using the customer form of payment. As described above with respect to the supplier form of payment, the determination process 180 may create the seller form of payment by transmitting a request to the travel record database 22 requesting the travel record database 22 add a data field defining the seller form of payment to the travel record. The determination process 180 may then proceed to block 242.

Figure 11:
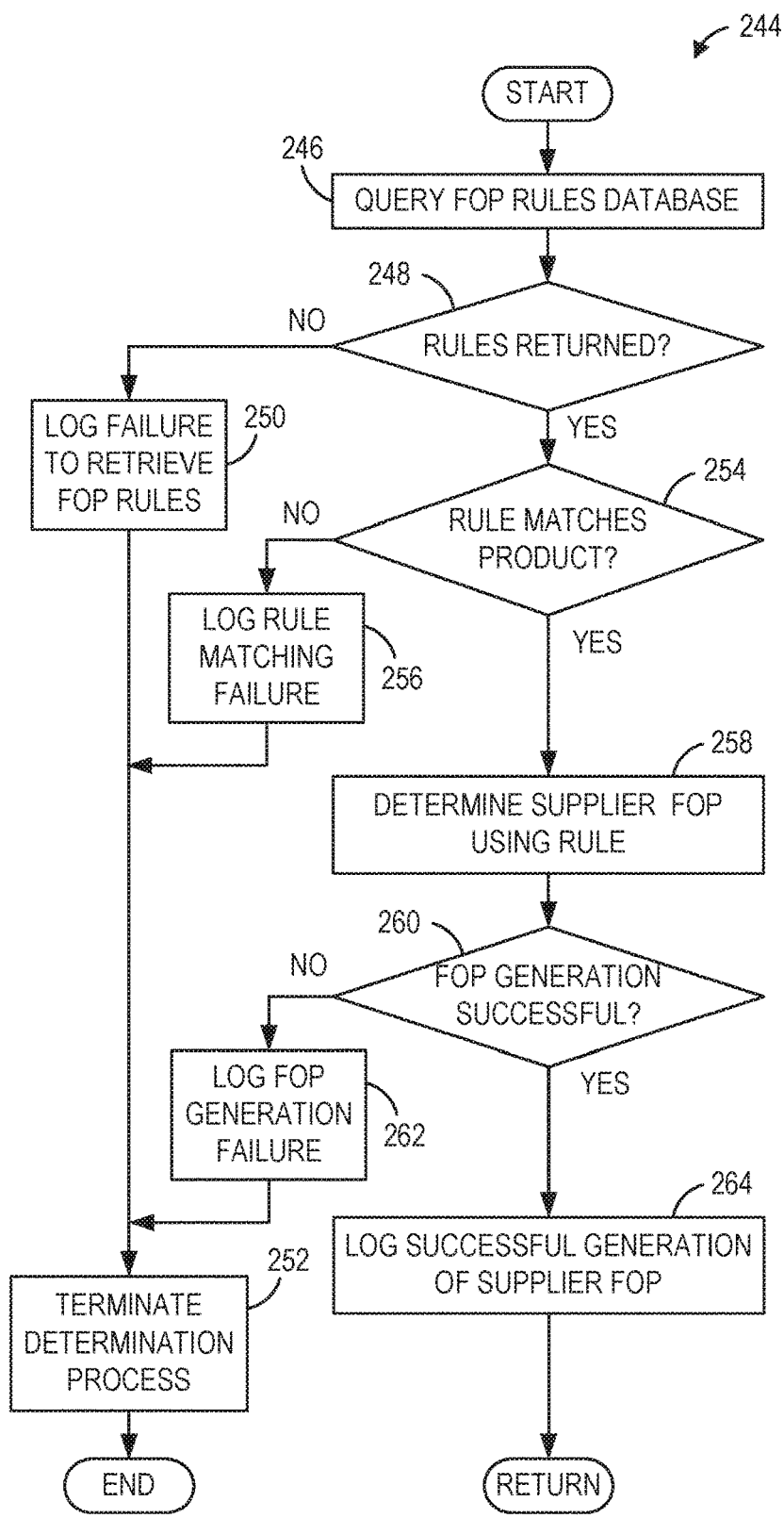
FIG. 11 is a flow chart of another sub-process that may be implemented by the form of payment determination process of FIG. 9.

Referring now to FIG. 11, a sub-process 244 is depicted that may be executed by the determination process 180 in block 242 to create the supplier form of payment. The supplier form of payment may be created in the travel record using payment rules retrieved from the payment rules database 186.

In block 246 of sub-process 244, the sub-process 244 may query the payment rules database 186 for rules governing forms of payment used by the seller to pay the supplier. If the payment rules database 186 fails to return any rules governing forms of payment used by the seller to pay the supplier ("NO" branch of decision block 248), the sub-process 244 may proceed to block 250. In block 250, sub-process 244 may request the logging process 182 generate an error record in the log database 184. The error record may indicate that rules governing forms of payment used by the seller to pay the supplier for the product being analyzed are not present in the payment rules database 186. The sub-process 244 may then proceed to block 252 and terminate the determination process 180.

If the payment rules database 186 returns at least one rule governing forms of payment used by the seller to pay the supplier ("YES" branch of decision block 248), the determination process 180 may proceed to block 254. In block 254, the sub-process 244 may attempt to match the returned rules to the selected product based on the information retrieved from the travel record and the other data received in block 202 of the determination process 180. If either no rules match the product, or more too many rules (e.g., more than one rule) matches the product ("NO" branch of decision block 254), the sub-process 244 may proceed to block 256.

In block 256, sub-process 244 may request the logging process 182 generate an error record in the log database 184 indicating that either no rules or too many rules matched the product. The sub-process 244 may then proceed to block 252 and terminate the determination process 180.

If an appropriate number of the rules (e.g., one rule) match the product ("YES" branch of decision block 254), sub-process 244 may proceed to block 258 and determine the supplier form of payment using the matching payment rules. The matching rules may define the supplier form of payment directly (e.g., the rules includes a data field that identifies the supplier form of payment or that associates the rules with the supplier form of payment), or by providing an identifier that can be used to determine the supplier form of payment.

In response to retrieving the supplier form of payment or the identifier, the sub-process 244 may transmit a request to the payment system 24 requesting the payment system 24 create a data field in the travel record defining the form of payment from the seller to the supplier for the selected product. The data field may define a payment from the seller to the supplier, and may be used by the payment system 24 to complete the transaction.

In block 260, if the payment system 24 fails to acknowledge generation of the supplier form of payment ("NO" branch of decision block 260), the sub-process 244 may proceed to block 262 and request the logging process 182 generate an error record in log database 184. The error record may indicate that generation of the supplier form of payment failed. The sub-process 244 may then proceed to block 252 and terminate the determination process 180.

If the payment system 24 acknowledges creation of the supplier form of payment ("YES" branch of decision block 260), the sub-process 244 may proceed to block 264 and request the logging process 182 generate a record in the log database 184 indicating the supplier form of payment has been successfully created for the selected product. The sub-process 244 may then transmit a response to the originally received EDIFACT or XML request indicating successful creation of the supplier form of payment. The sub-process 244 may then return to block 238 of the determination process 180.

Referring again to FIG. 9, in block 238 of the determination process 180, the determination process 180 may determine if all the products defined in the travel record have been analyzed. If all the products have not been analyzed ("NO" branch of decision block 238), the determination process 180 my proceed to block 266, select the next product, and return to block 210. If all of the products have been analyzed ("YES" branch of decision block 238), the form of payment module 62 may exit the determination process 180.

The form of payment determination process 180 may define forms of payment in the travel record for each product in the itinerary based at least in part on the merchant defined for the product by the merchant determination module 60. If the seller is the merchant for the product, the form of payment module 62 may add a seller form of payment data field to the travel record defining the form of payment used by the buyer to pay the seller, and add a supplier form of payment data field to the travel record defining the form of payment used by the seller to pay the supplier. If the supplier of the product is the merchant, the form of payment module 62 may add a data field to the travel record defining the form of payment used by the buyer to pay the supplier of the product.

The payment rules database 186 may be populated by an authorized party, such as the seller. The payment rules database 186 may thereby be customized to address specific requirements for each of a group of sellers. By way of example, the seller system 14 may transmit messages, such as EDIFACT or XML messages, containing rule data to the OLTP system 12, which may in turn populate the payment rules database 186 based on the content of the received messages.

In an embodiment of the invention, the payment rules database 186 may contain an extensible list of parameters that provide a set of input parameters. Each set of input parameters may be associated with a given form of payment or a form of payment identifier (e.g., an identification number) identifying the form of payment. In response to receiving a request having input parameters that match one or more rules, the payment rules database 186 may return the form of payment or identifier in a reply. In some cases, the form of payment may be stored as the identifier to avoid providing sensitive information, such as a credit card number or an account number, in an easily readable form.

Table 9 depicts exemplary rules that may be stored in the payment rules database 186. The rules shown are for exemplary purposes only, and the number and types of input parameters, the types of outputs, and the number of rules may be extended to any suitable type of input parameters, output parameters, number of rules, or types of products.

TABLE 9

SUPPLIER FORM OF PAYMENT RULES

| INPUT | | | | | | | OUTPUT |
|---|---|---|---|---|---|---|---|
| PRODUCT TYPE | PAYMENT MODEL | CUST. FOP | CC TYPE | MARK UP/DOWN | SUPP. | PROV. | FOP |
| FLIGHT | * | CC | VISA | * | | MK | INVOICE |
| HOTEL | POSTPAID | * | * | UP | | * | CC #1 |
| FLIGHT | * | LOYALTY POINTS | * | * | | AF | CASH |

By way of example, operation of the form of payment module 62 will be described using a hypothetical scenario. The scenario includes a travel record defining an itinerary that includes a flight provided by Air Mauritius (IATA code MK) for which a travel agency (i.e., the seller) is the merchant. The buyer is using a Credit Card issued by VISA® to pay for the reservation. In response to receiving a request to determine a form of payment for the flight, the form of payment module 62 may read a data field of the travel record to determine that the travel agency is the merchant for the flight.

In response to determining the travel agency is the merchant, form of payment module 62 may request creation of a seller form of payment data field in the travel record that defines the seller form of payment. The seller form of payment data field may be associated with the Air Mauritius flight, and may contain the buyer's credit card number (which may be concealed for security purposes), or some other identifier of the customer form of payment. In response to creating the seller form of payment data field in the travel record, the form of payment module 62 may request the fraud screening system 24 perform a fraud analysis on the buyer's credit card.

If the fraud screening system 26 indicates that no fraud was detected on the buyer's credit card, the form of payment module 62 may determine a supplier form of payment based on the payment rules in the payment rules database 186. The form of payment module 62 may create a supplier form of payment data field in the travel record that defines the supplier form of payment, and associate the supplier form of payment data field with the flight in the travel record. Applying the input parameters from the exemplary scenario to the rules defined in Table 9, the supplier form of payment returned is INVOICE.

In response to determining the seller form of payment, the form of payment module 62 may transmit a request to the travel record database 22 requesting the supplier form of payment data field define the supplier form of payment as INVOICE. Upon successful creation and population of the supplier form of payment in the travel record, the form of payment module 62 may transmit a reply to the OLTP system 12 indicating the form of payment has been successfully created in the travel record.

Critical Product Determination

In some cases, the itinerary defined by the travel record may include travel products supplied by different suppliers. In response to receiving a request to book an itinerary with multiple suppliers, the OLTP system 12 may transmit a booking confirmation request to each of the corresponding supplier systems 16. This can lead to a scenario in which some of the booking confirmation requests are rejected and others are confirmed by the respective supplier systems 16. In other cases, a single supplier may be able to confirm booking of one product but not another if, for example, one of the products is not available.

When a booking request is rejected, whether or not any confirmed travel products should be booked may depend on how important the rejected product is to the traveler. In cases where the product is critical to the trip, (i.e., the traveler is not willing to either take the trip if the specific product is unavailable or replace the specific product with an alternative product), the OLTP system 12 may be configured to cancel the trip. Canceling the trip may include rolling back any previously confirmed bookings, cancelling any previously made reservations, and rolling back any previously made payments. In cases where the product is non-critical to the trip (i.e., the traveler is either willing to take the trip without the product or the product can be replaced with an alternative product), the OLTP system 12 may be configured to confirm bookings for the remaining products in the itinerary.

Figure 12:
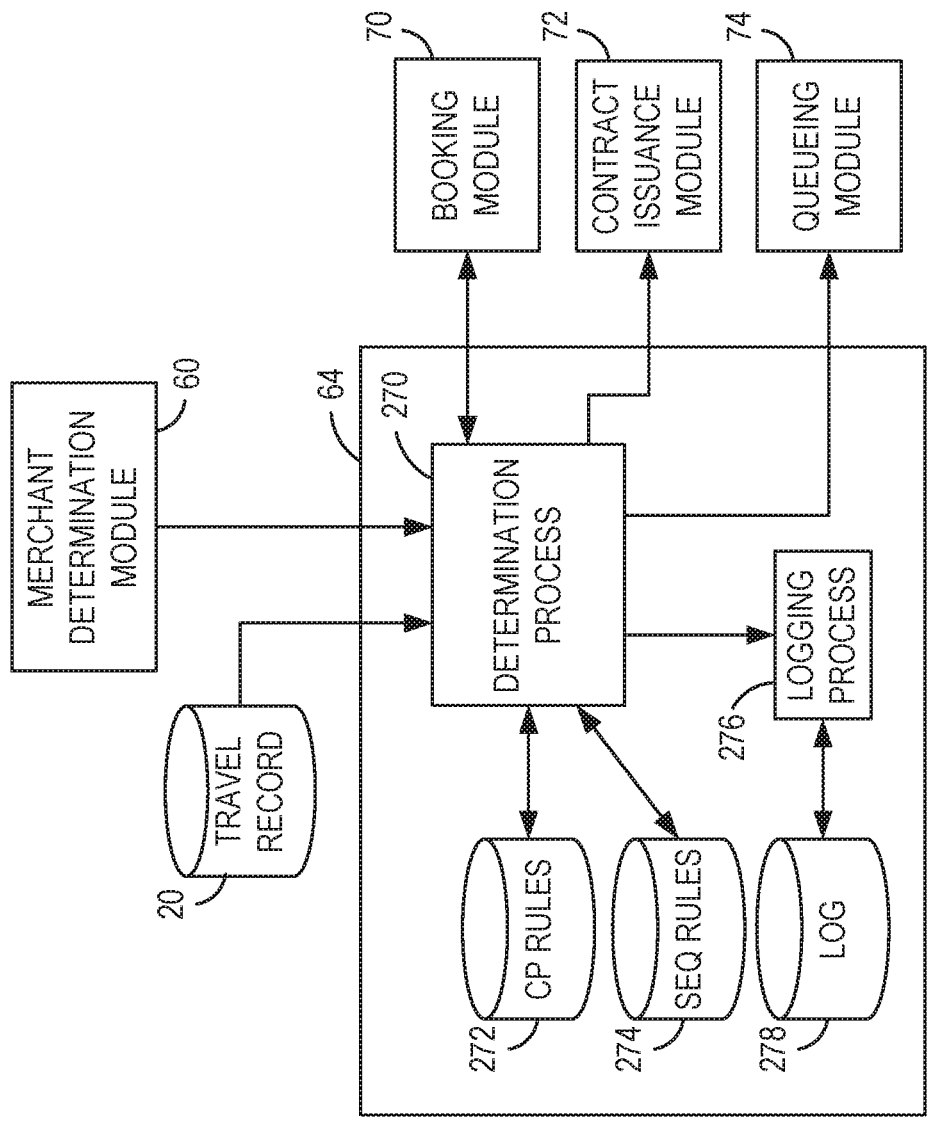
FIG. 12 is a diagrammatic view of the critical products module of FIG. 3.

Referring now to FIG. 12, the critical products module 64 may include a critical products determination process 270, a critical product rules database 272, and a sequencing rules database 274. The critical product rules database 272 and the sequencing rules database 274 may include rules that enable the determination process 270 to determine which products in an itinerary are critical, and the order in which products should be booked. The critical products module 64 may also include a logging process 276 that logs events (e.g., booking confirmation and rollback decisions) in a log database 278. The determination process 270 may communicate with the booking module 70, the contract issuance module 72, and the queuing module 74. The contract issuance module 72 may manage issuance of contracts between the buyer or seller and the supplier. The queuing module 74 may queue travel records that need manual intervention, or that need to be held while transaction processing is halted for some other reason, such as to wait for the results of a fraud screening.

By enabling the OLTP system 12 to determine which products are critical to the traveler, the critical products module 64 may enable the OLTP system 12 to avoid automatically cancelling all reservations that include a product which cannot be confirmed. The OLTP system 12 may thereby to prevent the seller from incurring unnecessary losses in revenue, and travelers from incurring the inconvenience of rebooking itineraries in cases where the itinerary could be salvaged. By enabling the OLTP system 12 to identify and cancel reservations for products in itineraries that cannot be salvaged, the critical products module 64 may also enable product suppliers to reduce unused inventory from reservations that are not honored due to a critical product in the itinerary being unavailable.

The critical product rules and booking sequence rules may be configured to determine the criticality of a product based on the characteristics of the product itself as well as the other products in the itinerary. By way of example, it may not make sense to keep an hotel reservation if a flight cannot be confirmed. In contrast, failure to confirm booking of an attraction (e.g., a theater performance) may not provide a reason to cancel a hotel reservation that is part of an itinerary for a business trip. However, an inability to confirm a booking of an attraction that provides the primary purpose for the trip (e.g., a trip to see a sporting event) may provide a reason to cancel airline and hotel reservations. Thus, complex rules may be needed to determine whether the reservation must be kept or cancelled based on both the purpose of the travel and the type of product. That is, a product may be considered critical to an itinerary if it would not make sense to confirm any of the remaining products in the itinerary if the product in question cannot be confirmed.

The critical product rules database 272 may maintain a set of rules that is configurable by the seller, and that identifies whether a product is critical or not based on input parameters. These input parameters may include product characteristics and seller characteristics. Examples of product characteristics that may be used as input parameters include whether the product is part of an itinerary sold as a package (e.g., an all-inclusive trip to a resort), the type of product (e.g., flight, hotel, car rental, etc.), the identity of the supplier or provider of the product (e.g., the carrier, hotel chain, or car rental company), or any other suitable characteristic of the product.

Examples of seller characteristics that may be used as input parameters include a corporate code that identifies the seller, the market (e.g., Brazil, Argentina, etc.) in which the sale was made, the point of sale of the product (e.g., the location of the specific office that made the sale). Rules matching the input parameters may define an output that identifies whether the product is critical or non-critical to the itinerary. The determination process 270 may thereby determine if a product is critical based on the output of the rule that matches the input parameters. Table 10 depicts exemplary critical product rules that may be stored in the critical product rules database 272.

The top row of Table 10 may illustrate a relatively broad rule that defines a hotel room (TYPE=HTL) sold by a specific seller (CORP CODE=B2W) in Brazil (MARKET=BR) as not being a critical product. This may be due to a seller policy that hotel rooms sold in Brazil are normally considered fungible because alternative hotels can typically be found that satisfy the traveler.

TABLE 10

CRITICAL PRODUCT RULES

INPUT

| PRODUCT CHARACTERISTICS | | | SELLER CHARACTERISTICS | | | |
|---|---|---|---|---|---|---|
| | | | CORP | | | |
| PACKAGE | TYPE | PROVIDER | CODE | MARKET | POS | OUTPUT |
| * | HTL | * | B2W | BR | * | NON-CRIT |
| DIS-1 | HTL | DISNEY | B2W | BR | * | CRITICAL |
| * | FLT | * | B2W | BR | * | CRITICAL |
| * | RAIL | * | B2W | BR | * | NON-CRIT |

The second row from the top may illustrate a relatively narrower rule that provides a specific case where the hotel may not be fungible. This rule includes input parameters that require the product be part of a specific travel package (PACKAGE=DIS-1, e.g., a weekend at DISNEY®), and be a hotel room (TYPE=HTL) that is provided by a specific provider (PROVIDER=DISNEY®) and sold by a specific seller (CORP CODE=B2W) in Brazil ((MARKET=BR). A product in an inventory matching these input parameters may be considered as a critical product by the seller because, in this specific case, staying in a room in the heart of the attraction park is likely considered important to the traveler. Additional rows of Table 10 show that the seller has implemented a relatively broad rule that defines a flight as critical to the itinerary, and another relatively broad rule that defines rail travel as non-critical.

Figure 13:
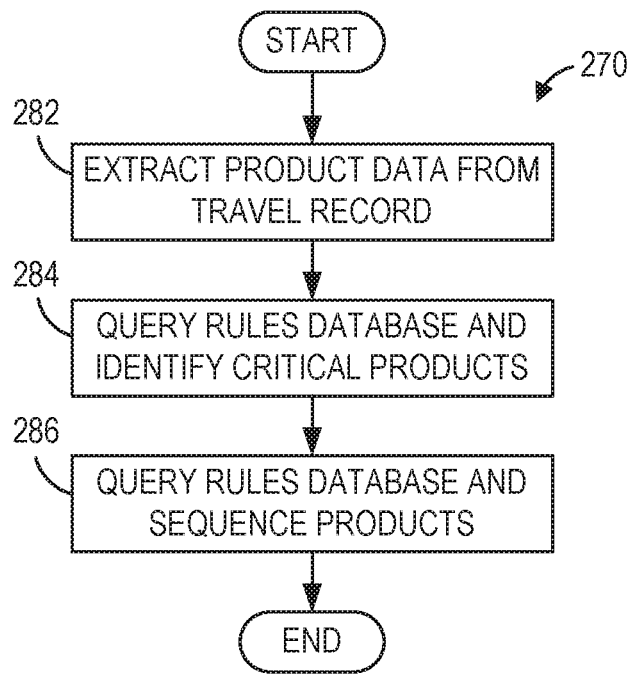
FIG. 13 is a flow chart of a critical products determination process that may be implemented by the critical products module of FIG. 12.

FIG. 13 depicts a flowchart of an embodiment of the determination process 270 that may be implemented by the critical products module 64. In block 282, the determination process 270 may extract product data from the travel record defining the itinerary that is being booked. This product data may include characteristics of the product and the seller, and may be used to define the input parameters for the critical products rules.

In block 284, the determination process 270 may query the critical product rules database 272 for one or more rules that match the input parameters extracted from the travel record. In an embodiment of the invention, a rules engine may determine the best applicable rule based on a weight assigned to each input parameter. This rule selection and weight assignment to determine the best rule may be done within the determination process 270, or outside the determination process 270. However the rules are selected, the critical product rules database 272 may determine the one or more rules that match the input parameters, and transmit a reply to the determination process 270 that contains either the matching rules or data indicative of the output of the rule, e.g., that the product is either critical or non-critical.

In response to receiving the reply, the determination process 270 may request the logging process 276 flag the product as critical or non-critical in the log database 278, as the case may be. The determination process 270 may flag the product, for example, by storing data indicating whether the product is critical or non-critical in the travel record. If the critical product rules database 272 fails to identify a matching rule, the determination process 270 may set the criticality of the product to a default value. In an embodiment of the invention, this default value may be "critical". In cases were the criticality of the product is set by default, the logging process 276 may flag the product to indicate that the value was determined by default.

In block 286, the determination process 270 may query the sequencing rules database 274. The sequencing rules may determine the order in which products in the itinerary are to be confirmed based at least in part on whether the product has been flagged as critical. The sequencing rules may be configured to optimize the order of confirmation to maintain a viable travel record during the confirmation process, which may facilitate rolling back the booking process should a problem be encountered. To this end, the sequencing rules may be configured to rank all products in the itinerary flagged as critical ahead of all products in the itinerary flagged as non-critical. This ranking may cause the OLTP system 12 to confirm booking of all critical products in an itinerary before attempting to book any non-critical products.

If the OLTP system is unable to book a critical product, there may be no reason to continue the booking process. Thus, the OLTP system 12 may be configured to wait until the booking of all critical products has been confirmed prior to booking the non-critical products. A similar logic may be applied to contract issuance. That is, the OLTP system 12 may wait until contracts are established for all critical products in an itinerary prior to attempting to establish contracts for any non-critical products.

Figure 14:
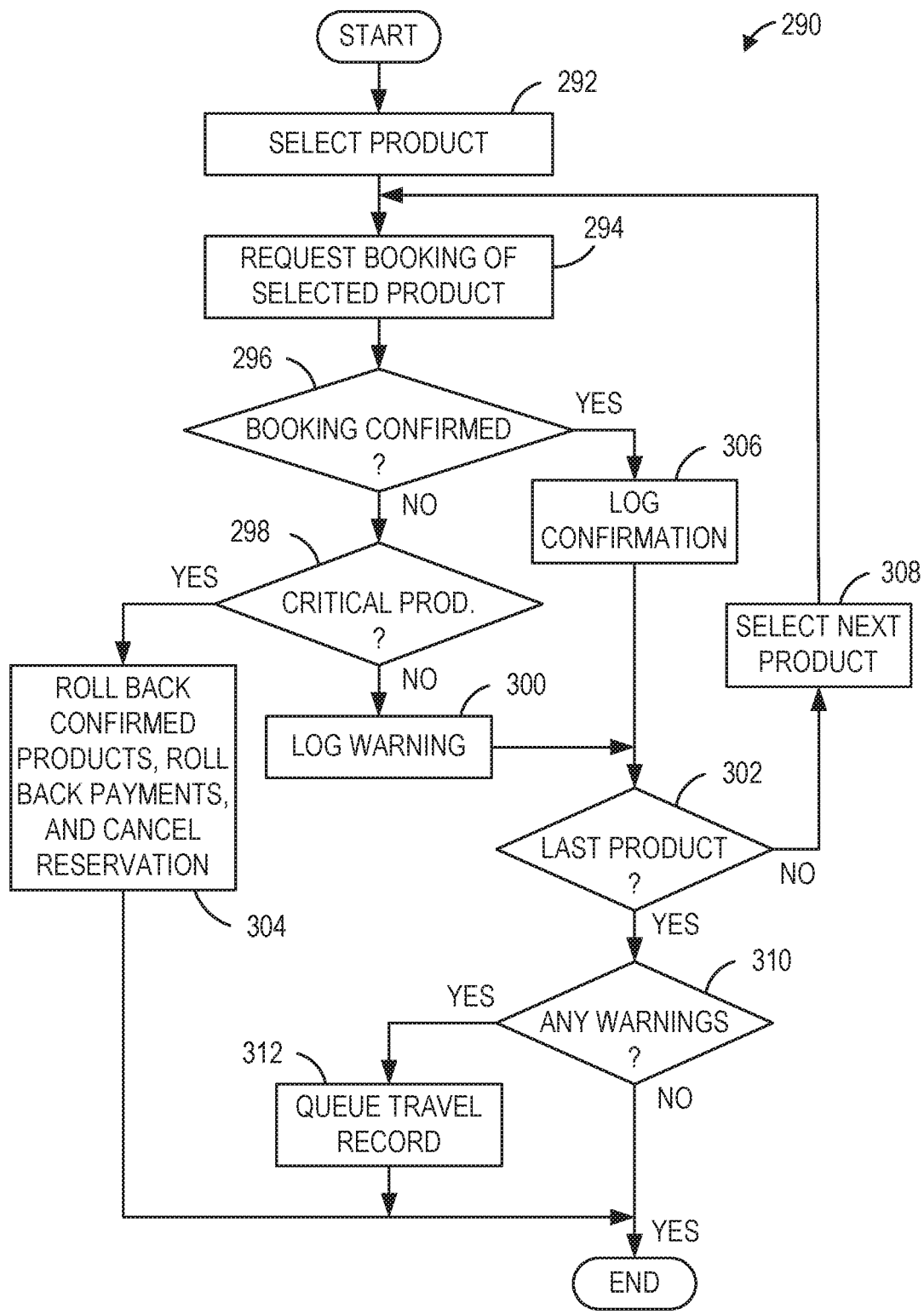
FIG. 14 is a flow chart of a booking confirmation process that may be implemented by the booking module of FIG. 3.

FIG. 14 depicts a flowchart of a booking confirmation process 290 that may be implemented by the critical products module 64 and/or booking module 70. In block 292, the confirmation process 290 may select a product from the itinerary being booked. The product may be selected based on the sequencing order determined by the critical products module 64, so that the highest ranked product in the itinerary is selected first. The confirmation process 290 may then proceed to block 294 and transmit a request to book the product to the supplier system 16, provider system 18, or another suitable system, such a computer reservation system.

If the booking is not confirmed ("NO" branch of decision block 296), the confirmation process 290 may proceed to block 298. In block 298, the confirmation process 290 may determine if the selected product is a critical product. This determination may be made, for example, by requesting the logging process 276 query the log database 278, or based on the data indicating whether the product is critical or non-critical in the travel record. If the selected product is non-critical ("NO" branch of decision block 298), the confirmation process 290 may proceed to block 300 and request the logging process 276 log a warning in the log database 278. The warning may indicate that the selected non-critical product was not booked, and that the traveler or seller may wish to select a replacement product. The confirmation process may then proceed to block 302.

If the selected product is a critical product ("YES" branch of decision block 298), the confirmation process 290 may proceed to block 304. In block 304, the confirmation process 290 may roll back any previous confirmations, roll back any corresponding payments, and cancel the reservation. To this end, the confirmation process 290 may request the logging process 276 provide a list of the confirmations logged in the log database 278. The confirmation process 290 may then roll back each previously confirmed booking in reverse order of their confirmation. Once all the confirmed bookings have been rolled back, the confirmation process 290 may roll back the payments and cancel the reservation. Cancelling the reservation may include, for example, deleting the travel record from the travel record database 22.

If the booking is confirmed ("YES" branch of decision block 296), the confirmation process 290 may proceed to block 306 and request the logging process 276 log the confirmation in the log database 278. The confirmation may also be logged by storing a confirmation number received from the reservation system in the travel record. In either case, the confirmation process 290 may proceed to block 302.

In block 302, the confirmation process 290 may determine if the selected product is the last product in the itinerary, i.e., if there are no remaining products in the itinerary that have not yet been processed. If the selected product is not the last product in the itinerary ("NO" branch of decision block 302), the confirmation process 290 may proceed to block 308, select the next product in the sequence, and return to block 294. If the selected product is the last product in the itinerary ("YES" branch of decision block 302), the confirmation process 290 may proceed to block 310.

In block 310, the confirmation process 290 may determine if any warnings were logged in the log database 278. If any warnings were logged ("YES" branch of decision block 310), the confirmation process 290 may proceed to block 312 and request the queuing module 74 queue the travel record for further processing. This processing may include, for example, providing an indication to the traveler or the seller that a non-critical product was not booked. This indication may prompt the traveler or seller to select an alternate product. If no warnings were logged ("NO" branch of decision block 310), the confirmation process 290 may end.

Figure 15:
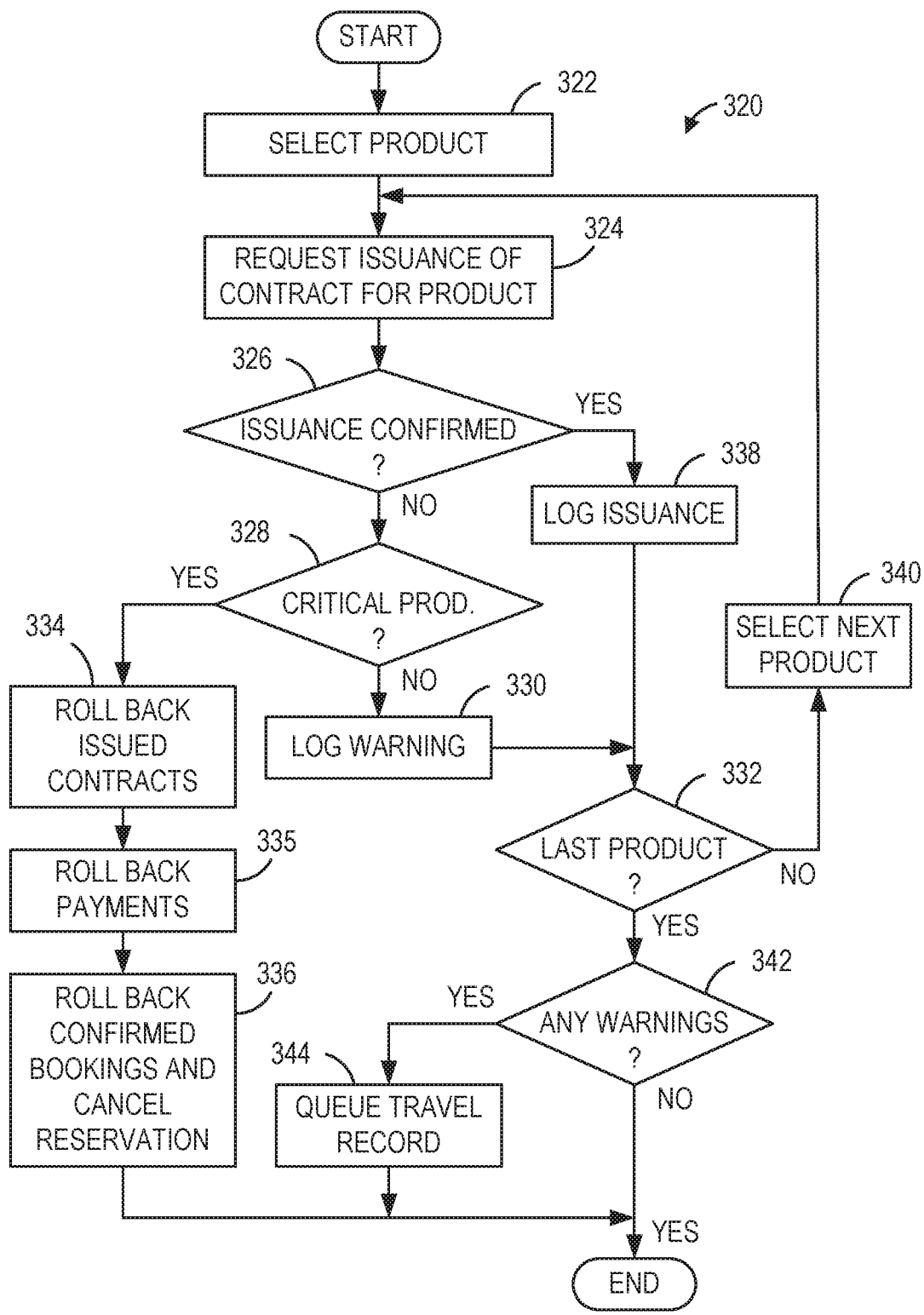
FIG. 15 is a flow chart of a contract issuance confirmation process that may be implemented by the contract issuance module of FIG. 3.

FIG. 15 depicts a flowchart of a contract issuance (e.g., ticketing) confirmation process 320 that may be implemented by the critical products module 64 and/or contract issuance module 72. In block 322, the confirmation process 320 may select a product from the itinerary. The product may be selected based on the sequencing order, so that the highest ranked product in the itinerary for which issuance of a contract has not been requested is selected. The confirmation process 320 may proceed to block 324 and transmit a request to issue a contract for the selected product. The request to issue may be transmitted, for example, to an electronic document system of the supplier, the provider, or a computer reservation system.

If issuance of the contract for the product is not confirmed ("NO" branch of decision block 326), the confirmation process 320 may proceed to block 328. In block 328, the confirmation process 320 may determine if the selected product is a critical product. If the selected product is non-critical ("NO" branch of decision block 328), the confirmation process 320 may proceed to block 330 and request the logging process 276 log a warning in the log database 278. The warning may indicate that a contract was not issued for the selected product, and that the traveler or seller may wish to select a replacement product. The confirmation process 320 may then proceed to block 332.

If the selected product is a critical product ("YES" branch of decision block 328), the confirmation process 320 may proceed to block 334. In block 334, the confirmation process 320 may roll back any contracts previously issued for products in the itinerary, and proceed to block 335. In block 335, the confirmation process 320 may roll back any payments and/or payment authorizations that were made for travel products in the itinerary. The confirmation process 320 may then proceed to block 336 and roll back any previous booking confirmations and cancel the reservation. The confirmation process 320 may roll back issued contracts and confirmed bookings in a reverse order from which they were issued or booked. Once all the confirmed bookings, payments and/or payment authorizations have been rolled back, the confirmation process may cancel the reservation by, for example, deleting the travel record from the travel record database 22.

If issuance of the contract is confirmed ("YES" branch of decision block 326), the confirmation process 320 may proceed to block 338, request the logging process 276 log the confirmation in the log database 278, and proceed to block 332. In block 332, the confirmation process 320 may determine if the selected product is the last product in the itinerary. If the selected product is not the last product in the itinerary ("NO" branch of decision block 332), the confirmation process 320 may proceed to block 340, select the next product in the sequence, and return to block 324. If the selected product is the last product in the itinerary ("YES" branch of decision block 332), the confirmation process 320 may proceed to block 342.

In block 342, the confirmation process 320 may determine if any warnings were logged in the log database 278. If any warnings were logged ("YES" branch of decision block 342), the confirmation process 320 may proceed to block 344 and queue the travel record for further processing. This processing may include, for example, rolling back the booking confirmation of the product that produced the warning, and providing an indication to the traveler or the seller that a contract was not issued for non-critical product so that the traveler or seller can select an alternate product. If no warnings were logged ("NO" branch of decision block 342), the confirmation process 320 may end.

Table 11 provides a set of exemplary critical product rules used in the following examples for the purpose of illustrating operation of embodiments of the critical products module 64.

TABLE 11

CRITICAL PRODUCT RULES

| INPUT | | | | | | OUTPUT |
|---|---|---|---|---|---|---|
| PRODUCT CHARACTERISTICS | | | SELLER CHARACTERISTICS | | | |
| PACKAGE | TYPE | PROVIDER | CORP CODE | MARKET | POS | |
| * | FLT | * | B2W | * | * | CRITICAL |
| * | HTL | * | B2W | * | * | CRITICAL |
| * | CAR | * | B2W | * | * | NON-CRT |

By way of example, operation of the critical products module 64 is described using a hypothetical scenario in which a traveler reserves a trip to Miami. The exemplary itinerary includes a flight, a hotel, and a car rental. The product data for the itinerary may be obtained by querying the travel record database 22 for the travel record corresponding to the reserved trip. The determination process 270 may analyze the flight by querying the critical product rules database 272 using the following input parameters, which may have been extracted from the travel record: Package: (none), Product Type: FLT, Provider Code: AF, Corporate Code: B2W, Market: FR, and Point of Sale: PARB221DU.

The critical product rules database 272 may identify the applicable rule (e.g., the rule defined by the top row of Table 11), and return the result to the determination process 270. In the present exemplary case, matching the aforementioned input parameters with the rules defined by the exemplary critical product rules Table 11 indicates that the flight is defined as a critical product by the seller B2W.

The determination process 270 may analyze the hotel reservation by querying the critical product rules database 272 with the following parameters, which may have been extracted from the travel record: Package: (none), Product Type: HTL, Provider Code: IHG, Corporate Code: B2W, Market: FR, and Point of Sale: PARB221DU. The critical product rules database 272 may identify the applicable rule (e.g., the rule defined by the middle row of Table 11), and return the result to the determination process 270. In the present exemplary case, matching the aforementioned input parameters with the rules defined by the exemplary critical product rules Table 11 indicates that the hotel is defined as a critical product by the seller B2W.

The determination process 270 may analyze the car rental reservation by querying the critical product rules database 272 with the following parameters, which may have been extracted from the travel record: Package: (none), Product Type: CAR, Provider Code: AVIS®, Corporate Code: B2W, Market: FR, and Point of Sale: PARB221DU. The critical product rules database 272 may identify the applicable rule (e.g., the rule defined by the bottom row of Table 11), and return the result to the determination process 270. In the present exemplary case, matching the aforementioned input parameters with the rules defined by the exemplary critical product rules Table 11 indicates that the car rental is defined as a non-critical product by the seller B2W.

Based on the results of the critical product determination, the determination process 270 may attempt to book the critical products, e.g., the flight reservation and hotel reservation, prior to attempting to book the car rental. In response to receiving confirmations of the flight and hotel from their respective reservation systems, the determination process 270 may store the confirmation numbers in the travel record.

The determination process 270 may then attempt to book the car rental. In response to the car rental reservation system failing to confirm the car rental, the determination process 270 may determine if a rollback of bookings for any other products in the itinerary is needed. Because the car rental is defined as a non-critical product by the seller, the booking process may continue, and the flight and hotel bookings left intact.

The determination process 270 may then establish a contract for the flight reservation (e.g., by causing a ticketing system to issue an e-ticket) and the hotel. The travel record may be queued due to the failure to confirm one of the products in the itinerary. Queuing the travel record may cause a warning to be transmitted to the seller system so that the seller can take proactive corrective action with regard to replacing the car rental product.

By way of another example describing operation of the critical products module 64, a hypothetical scenario includes a traveler who reserves a trip to Miami having an itinerary that includes a flight, a hotel, and a car rental. As with the previous example, application of the rules in Table 11 indicates that the flight and hotel are critical products, and the car is a non-critical product. Based on the results of the critical product determination, the determination process 270 may attempt to book the critical products, e.g., the flight reservation and hotel reservation, prior to attempting to book the car rental. As before, the booking of the flight reservation is confirmed. However, in this example, the hotel reservation system fails to confirm booking of the hotel reservation. Because the hotel is defined as a critical product, the determination process 270 determines that the itinerary defined by the travel record is no longer viable. That is, without the hotel, the remaining itinerary has no value to the traveler. Thus, in response to the failure to confirm the hotel, the determination process 270 may cancel the flight reservation and transmit a warning to the seller system indicating that the itinerary has been canceled.

By identifying critical products in an itinerary using rules stored in the critical product rules database 272, the critical products module 64 may enable sellers (e.g., online travel agencies) to define dynamically flexible rules. The critical product rules database 272 may enable sellers to define which products are critical products in an itinerary based on selected itinerary characteristics, such as package, market, supplier, or provider values. The critical product rules database 272 may allow rules to be configured for different types of products, such as flights, hotels, cars, attractions, cruises, and travel insurance. Products may be flagged as critical or non-critical in the log database 278 in order to facilitate following processes, such as cancellation or modification of the travel record.

By sequencing products in an itinerary using rules stored in the sequencing rules database 274 by the seller, the critical products module 64 may enable seller control over the sequencing of actions in order to preserve a viable reservation. If a critical product cannot be confirmed, rollback mechanisms may be triggered in order to clean the reservation and roll back payments between the buyer and the online travel agency.

Recoverable Products

In some cases, a fraud analysis may be performed on the customer form of payment. If the fraud analysis result is a recommendation that the customer form of payment be subjected to another type of fraud analysis (e.g., a manual review by a fraud management specialist), the final fraud analysis result for the customer form of payment may not available for a period of time (e.g., a few hours or days). In order to preserve the availability and pricing of the travel products in the itinerary during this period of time, the OLTP system 12 may book some or all of the products and confirm the booking before the final fraud analysis status is known. To manage exposure of the seller to penalties for cancelling products after expiration of an allowable cancellation period, the OLTP system 12 may identify which products can be booked and issued against the supplier with a limited financial liability in case of cancellation if the final fraud status indicates the presence of fraud.

Figure 16:
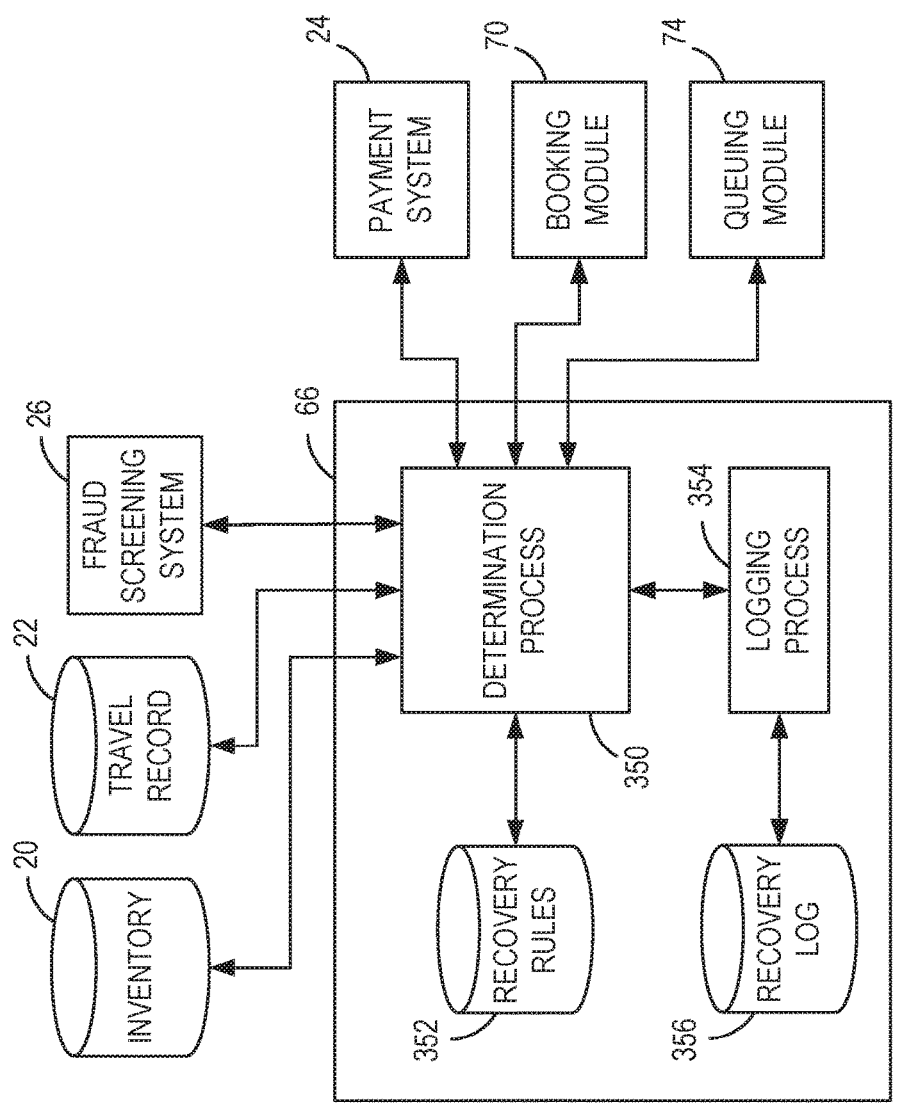
FIG. 16 is a diagrammatic view of the recoverable products module of FIG. 3.

Referring now to FIG. 16, the recoverable products module 66 may include a recoverable products determination process 350 that accesses a database of recovery rules, or recovery rules database 352, and a logging process 354 which maintains a recovery log database 356. The determination process 350 may receive data from the inventory database 20 that defines product availability, retrieve data from the travel record database 22 that defines product characteristics, and retrieve data from the fraud screening system 26 that defines a status of a fraud screening for the customer form of payment. The determination process 350 may also communicate with the payment system 24 to determine penalties, the booking module 70 to book travel products, and the queuing module 74 to queue travel records related to transactions that are waiting for the results of a fraud screening.

In response to the fraud screening system 26 indicating that a form of payment used by the buyer is potentially fraudulent, an additional fraud analysis, such as a manual review, may be ordered to determine conclusively if the transaction is fraudulent. Due to the expected duration of the review, there may be a need to preserve the availability and pricing of one or more products of the itinerary until the results of the manual review are known by booking products prior to completion of the manual review. However, in some cases, booking a product may result in the seller incurring a liability to the supplier if the product is later canceled because the manual review indicates the transaction is fraudulent.

To limit this liability, the determination process 350 may, in response to a manual review being ordered, determine a potential financial liability of the seller for one or more of the products if the products are booked prior to the final fraud status being determined. Products that can be booked and later canceled if the transaction is determined to be fraudulent without the seller incurring a financial liability, or that result in the seller incurring a financial liability below a predetermined limit, are considered to be "recoverable products". A recoverable product is a product that can be booked in response to the fraud module indicating the transaction should be challenged without the seller incurring an unacceptable financial liability. For example, a product may be considered recoverable if the terms and conditions of purchasing the product allow sufficient time to request a refund without incurring a penalty after the results of the manual review are received.

Figure 17:
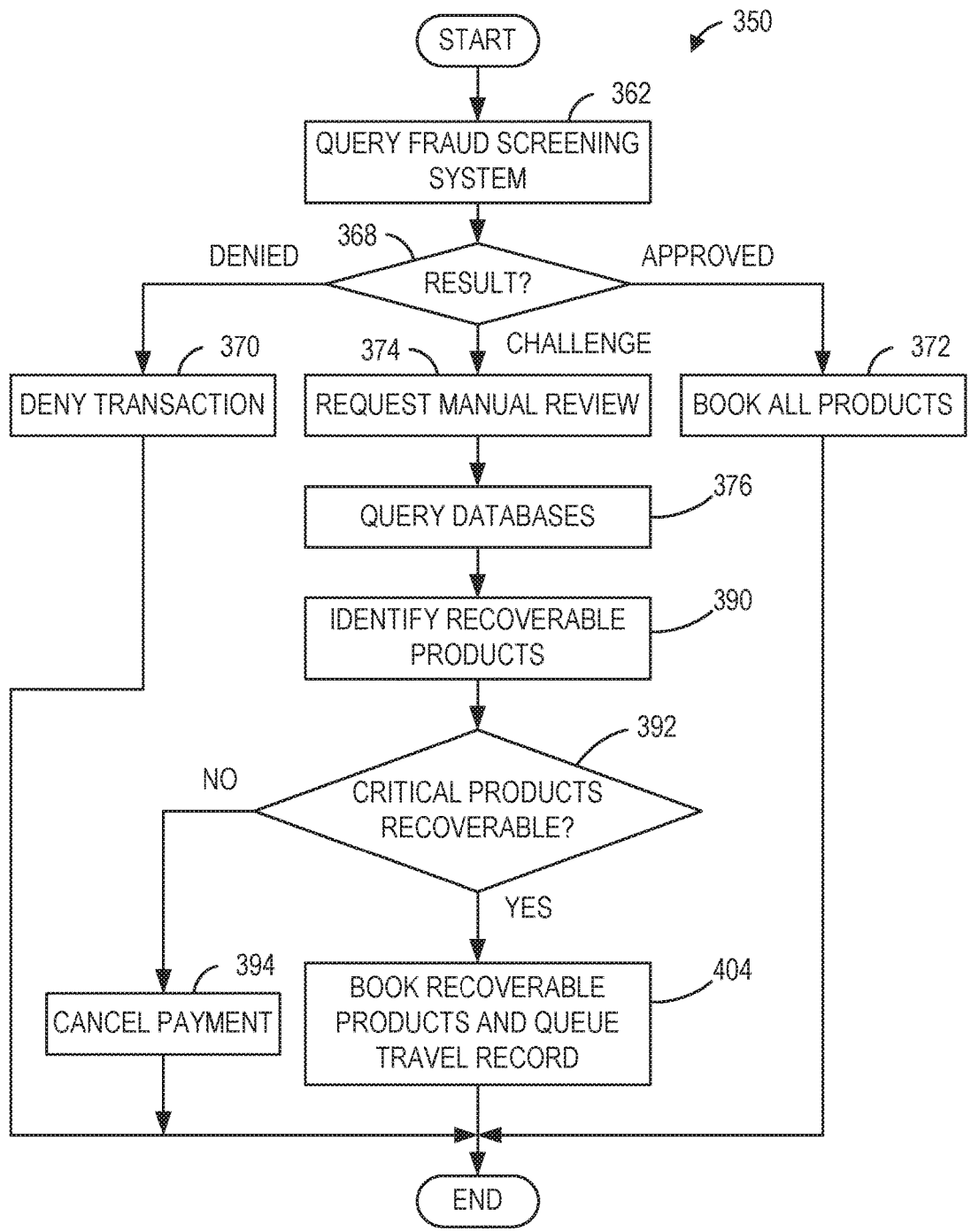
FIG. 17 is a flow chart of a recoverable products determination process that may be implemented by the recoverable products module of FIG. 16.
Figure 18:
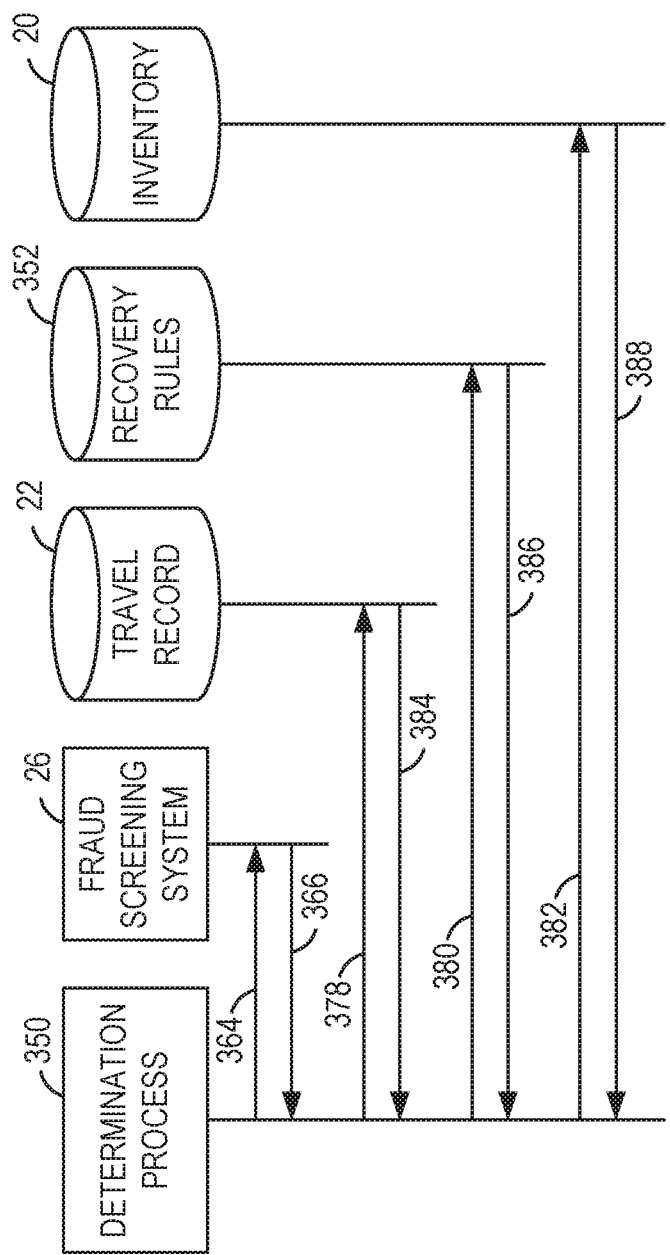
FIG. 18 is a diagrammatic view of messages that may be transmitted between the determination process of FIG. 17 and a fraud screening system, a travel record database, a recovery rules database, and an inventory database.
Figure 19:
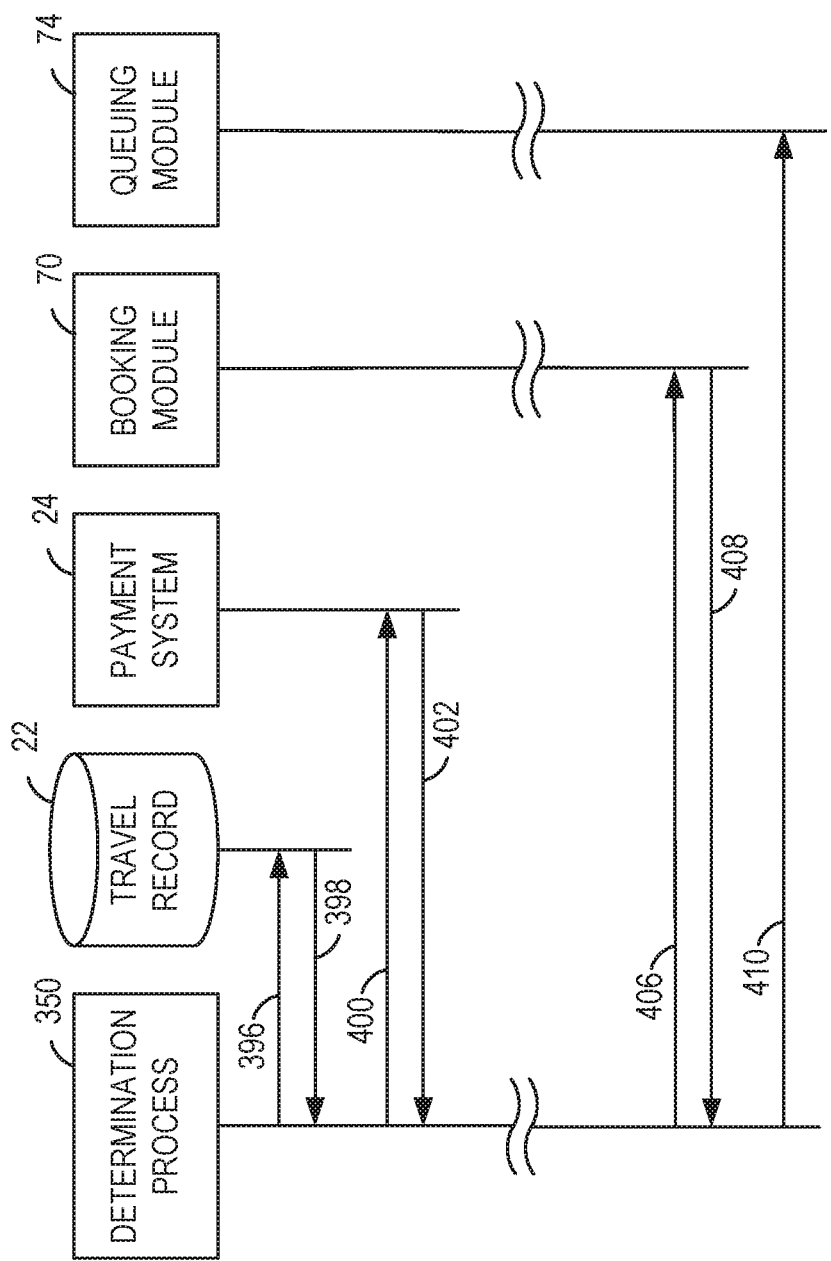
FIG. 19 is a diagrammatic view of messages that may be transmitted between the determination process of FIG. 17 and the travel record database, a payment system, the booking module of FIG. 3, and the queuing module of FIG. 3.

Referring now to FIGS. 17 through 19, FIG. 17 depicts a flowchart of an embodiment of the recoverable products determination process 350 that may be implemented by the recoverable products module 66, and FIGS. 18 and 19 illustrate exemplary messaging that may occur between the determination process 350, inventory database 20, travel record database 22, fraud screening system 26, and recovery rules database 352.

In block 362, the determination process 350 may transmit a query 364 to the fraud screening system 26. The fraud screening system 26 may determine a likelihood that the transaction is fraudulent, and transmit a response 366 to the determination process 350. If the response 366 indicates that the fraud screening system 26 has detected fraud ("denied" branch of decision block 368), the determination process 350 may proceed to block 370 and deny the transaction. If the transaction is denied, authorization for charging the cost of the transaction to the form of payment may be rolled back. If the response 366 indicates that no fraud was detected ("approved" branch of decision block 368), the determination process 350 may proceed to block 372 and request the booking module 70 book the products of the itinerary being purchased. If the response 366 indicates that the fraud analysis was inconclusive ("challenge" branch of decision block 368), the determination process 350 may proceed to block 374 and request a manual review of the transaction.

In response to the manual review being initiated, the determination process 350 may begin identifying which products of the itinerary are recoverable by proceeding to block 376. In block 376, the determination process 350 may transmit queries 378, 380, 382 to the travel record database 22, recovery rules database 352, and inventory database 20, respectively. The decision to transmit the query 382 to the inventory database 20 may depend on the rules retrieved from the recovery rules database 352. That is, if the recovery rules identified in the recovery rules database 352 do not depend on the availability of a product in the itinerary, the determination process 350 may not need to query the inventory database 20.

In response to receiving the query 378, the travel record database 22 may transmit a reply 384 to the determination process 350 that includes the travel record associated with the transaction being processed. In response to receiving query 380, the recovery rules database 352 may transmit a reply 386 defining the rules governing cancellation of bookings for each of the products in the itinerary. In response to receiving query 382, the inventory database 20 may transmit a reply 388 defining an availability of each of the products in the itinerary.

Once the database queries have been completed, the determination process 350 may proceed to block 390 and identify which products of the itinerary are recoverable. The determination process 350 may determine parameters that are relevant to the recovery rules based on the travel record returned by reply 384. The parameters defined by the travel record may include the point of sale for the product, the type, price, supplier, and provider of the product, a traveler loyalty level, and a total price of the itinerary. Additional parameters relevant to the recovery rules may include an availability of each product as determined from reply 388.

The recovery rules may define, for each product in the itinerary, a minimum remaining time before a contract must be issued for products defined in a PNR (e.g., flights stored in a PNR database of a GDS), a minimum number of days before the date of use for the product (e.g., the departure date for a flight), a minimum time before the end of the day, a maximum amount of penalties allowable if the booking is canceled, and a minimum remaining time before a penalty would be incurred for products not defined by the PNR (e.g., hotel rooms or rental cars).

The recovery rules applied by the determination process 350 may vary depending on characteristics of the transaction. For example, a transaction to book an itinerary having a relatively high value to the seller may be subject to different rules than a transaction to book an itinerary having a relatively low value to the seller. The rules may also vary depending on the country, region, or city of the point of sale. The amount of time remaining between booking and use of the product may also determine whether the product or the itinerary is recoverable. For example, a product may be considered unrecoverable if the final fraud analysis is unlikely to be completed before reaching a time limit that must be met to avoid a penalty.

The rules may also vary based on combinations of parameters, e.g., a status of the passenger, an availability of the product, or a class of service associated with the product. For example, if there is limited availability of a product for a traveler with a gold card, a product that would otherwise be considered unrecoverable may be defined as recoverable. This flexible approach to defining recoverable products may allow a product to be booked even if there is a penalty for cancelling or insufficient time to perform the manual review before a penalty for cancellation is invoked. The rules may thereby ensure that a product which would otherwise be considered unrecoverable is kept available for a traveler having a higher than normal status, e.g., a traveler with a gold card. A seller may define rules that provide preferential treatment to some travelers, for example, based on a policy that the seller would rather incur a penalty than harm a relationship with a high value customer.

In cases where no specific rules regarding a product are defined in the recovery rules database, the recovery rules may include default rules. As an example of a default rule, a room for a hotel that does not list any conditions for which a penalty is assessed may be treated as unrecoverable if the booking of the room would occur after 6:00 pm on the day before check-in. In other cases, the default rule may be that any product which does not have rules defined in the recovery rules database is treated as non-recoverable.

Once the applicable recovery rules have been determined, the determination process 350 may determine whether each product in the travel record is recoverable. This determination may include, for each applicable time limit, determining if the amount of time remaining is greater than the minimum time limit defined by the recovery rules. For example, the determination process 350 may determine if the remaining amount of time in the business day is greater than the minimum amount of time required by the recovery rules. The determination process 350 may also determine if the amount of time before the use date of the product is greater than the minimum amount of time before the use date of the product required by the recovery rules. The determination process 350 may also determine whether the product is considered recoverable even if booking the product would expose the seller to certain penalties. If all the conditions defined by the recovery rules are met, the product may be considered recoverable.

During the analysis, the logging process 354 may flag each product analysis result and store the parameters used to identify the product recoverability (e.g., time limit, availability, minimum time, minimum date, time before expiration) in the recovery log database 356. In case an issue is encountered by the determination process 350 that prevents completion of the analysis (e.g., a missing rule), the logging process 354 may store data in the recovery log database 356 indicating which product information could not be retrieved. If the recoverability of a product cannot be determined, the determination process 350 may return an error. In the event of an error, the logging process 354 may flag the product that caused the failure and store an error log in the recovery log database 356.

Once the determination process 350 has determined which products of the itinerary are recoverable, the determination process 350 may proceed to block 392 and determine whether the critical products of the itinerary are all recoverable. If one or more of the critical products is not recoverable ("NO" branch of decision block 392), it may not be possible to guarantee the viability of the reservation, and the determination process 350 may proceed to block 394 to cancel payment. Cancellation of the payment may include rolling back the payment authorization and deleting the form of payment field from the travel record.

Referring now to FIG. 19, the determination process 350 may begin the process of cancelling payment by transmitting a request 396 to the travel record database 22 requesting the travel record database 22 delete the form of payment field from the travel record. In response to the form of payment field being deleted from the travel record, the travel record database 22 may transmit a reply 398 to the determination process 350 acknowledging that the form of payment data field has been deleted. The determination process 350 may also transmit a request 400 to the payment system 24 requesting the payment system 24 roll back authorization to charge the transaction to the customer form of payment. This rollback may include, for example, triggering the release any holds placed on the customer form of payment by the issuing bank for the amount of the transaction. In response to successfully rolling back authorization, the payment system 24 may transmit an acknowledgement 402 to the determination process 350.

If the determination process 350 determines that all the critical products are recoverable ("YES" branch of decision block 392), the determination process 350 may proceed to block 404. In block 404, the determination process 350 may book all the recoverable products and queue the travel record until the results of the manual review are received. To this end, the determination process 350 may transmit a request 406 to the booking module 70 requesting that the booking module 70 book all of the recoverable products. In response to the products defined by the booking request 406 being booked, the booking module 70 may transmit a reply 408 acknowledging that the products have been booked. In response to receiving the acknowledgement, the determination process 350 may transmit a request 410 to the queuing module 74 requesting the travel record be queued for further processing in response to either reception of the results of the manual review, or the expiration of a time limit.

Table 12 depicts an exemplary table of recovery rules that may reside in the recovery rules database 352. The columns labeled as input may define input parameters corresponding to context data retrieved from the travel record. In the exemplary embodiment shown, the input data includes the point of sale country, the total value of the itinerary, the type of passenger, and the type of product. The input data shown also includes an availability of the product, which may be determined by querying the inventory database 20. A default rule may be defined, for example, by including a row with only the type of product as an input (e.g., HTL) that defines a default output (e.g., 1 day minimum advanced notice).

TABLE 12

RECOVERY RULES

| INPUT | | | | | OUTPUT | | | |
|---|---|---|---|---|---|---|---|---|
| POS CTRY | TOTAL VALUE | PROD AVL | PASS TYPE | PROD TYPE | MIN $T_{PNR}$ | MIN $T_{NPNR}$ | MIN $T_{EOD}$ | PEN ACCPT |
| BR | <1500 BRL | * | * | * | 3 DAYS | 3 DAYS | 3 HRS | N |
| BR | >1500 BRL | * | * | * | 10 DAYS | 12 DAYS | 5 HRS | N |
| * | * | <10 | GLD | AIR, HTL | 0 | 0 | 0 | Y |
| | | | | HTL | | 1 DAY | | |

The output of the rule may include a minimum amount of time $T_{PNR}$ remaining between the current time and the time at which the provider's rules require a ticket to be issued for a product defined in a PNR, a minimum amount of time $T_{NPNR}$ between the current time and the time a penalty will be incurred if a contract is not issued for a product that is not defined in a PNR, and a minimum time $T_{EOD}$ between the current time and the end of the business day. The minimum time $T_{EOD}$ may be determined, for example, based on how long it takes the determination process 350 to check for critical products.

By way of example, operation of the recoverable products module 66 will now be described using several hypothetical scenarios. The context of a first scenario may include an itinerary comprising one critical product that is a flight which was reserved through a GDS (product type=Air, GDS). The total value of the itinerary defined by the travel record may be 1000 Brazilian Real (BRL), and the itinerary may not include any non-critical products, e.g., the flight may be the only product in the itinerary. The last date on which a ticket can be issued for the flight may be six days after booking, there may be no penalty for cancelling the flight, and there may be four hours remaining between the current time and the end of the day.

The above context may satisfy the input requirements of the rule defined in the first row of Table 12 by having a total value of less than 1500 BRL. The context may fail to satisfy the input requirements of the rule defined in the second row of Table 12 because the total value is not greater than 1500 BRL, and may fail to satisfy the input requirements of the rule defined in the third row of Table 12 because the traveler is not a Gold Card member and the availability of the product is not less than ten units. Thus, the recovery rules database 352 may return the rule defined by the first row of Table 12.

Applying the returned rule to the present context, the requirements of the rule may be satisfied because there are more than three hours left before the end of the business day (e.g., there is time for critical products to be checked), the product has a time limit for issuing a ticket (e.g., six days) greater than $T_{PNR}$ (e.g., three days), and does not contain penalties. The product may therefore considered recoverable, and the itinerary may be booked and queued as the flight is the only critical product.

The context of a second scenario may include an itinerary comprising one critical product that is a flight which was not reserved through a GDS (product type=Air, non-GDS). The total value of the itinerary defined by the travel record may be 1800 BRL. The last date on which a ticket can be issued for the flight may be 11 days after the flight is booked, there may be no penalty for cancelling the flight, and there may be four hours remaining between the current time and the end of the business day.

The above context may satisfy the input requirements for the rule defined in the second row of Table 12 by having a total value greater than 1500 BRL, may fail to satisfy the input requirements for the rule defined in the first row of Table 12 because the total value is not less than 1500 BRL, and may fail to satisfy the input requirements of the rule defined in the third row of Table 12 because the passenger is not a Gold Card member and the availability is not less than 10. Thus, the recovery rules database 352 may return the rule defined by the second row of Table 12.

Applying the returned rule to the present context may indicate that the product is not recoverable because the rule requires a minimum time $T_{EOD}$ of 5 hours, which is greater than the number of hours left in the business day. Thus, the product may be considered non-recoverable, and the determination process 350 may cancel payment.

The context of a third scenario may include an itinerary comprising one critical product that is a flight which was not reserved through a GDS (product type=Air, non-GDS). The total value of the itinerary defined by the travel record may be 1800 BRL, and the itinerary may not contain any non-critical products. The last date on which a ticket can be issued for the flight may be two days after the flight is booked, there may be no penalty for cancelling the flight, and there may be two hours remaining between the current time and the end of the business day. The traveler may be a Gold level frequent flyer, only two seats may be currently available for the flight.

Because the total value of the itinerary is greater than 1500 BRL, the above context may fail to satisfy the input requirements of the rule defined in the first row of Table 12, but may satisfy the input requirements of the rule defined in the second row of Table 12. Because the availability is less than 10 units, the traveler is a Gold level frequent flyer, and the product is of type AIR, the context may also satisfy the input requirements of the rule defined in the third row of Table 12. Thus, the recovery rules database 352 may return the rules defined by the second and third rows of Table 12.

Applying the returned rules to the above context, the rule defined by the second row of Table 12 may not be satisfied because the product must be issued less than 10 days after booking, and there are less than five hours left in the business day. However, the rule defined by the third row of Table 12 does not have any applicable minimum time limits (i.e., $T_{NPR}$ and $T_{EOD}$=0). The product may therefore be considered recoverable based on this rule, and the itinerary may be booked and queued as the flight is the only critical product. In cases where more than one rule matches a scenario, the rule having the greater number of matching input parameters may be used to define the output.

The context of a fourth scenario may include an itinerary comprising one critical product that is a flight which was reserved through a GDS (product type=Air, GDS). The total value of the itinerary defined by the travel record may be 500 BRL, and the itinerary may not contain any non-critical products. The last date on which a ticket can be issued for the product may be nine days after the product is booked, there may be no penalty for cancelling the product, and there may be four hours between the current time and the end of the business day.

The above context may satisfy all the input requirements of the rule defined in the first row of Table 12 by having a total value of less than 1500 BRL. The context may fail to satisfy the total value constraint of the rule defined in the second row of Table 12, and may fail to satisfy the amount or passenger type requirement of the rule defined by the third row of Table 12. Thus, the recovery rules database 352 may return the rule defined by the first row of Table 12.

Applying the returned rule to the present context, the number of hours left before the end of the day (e.g., four) is greater than the $T_{EOB}$ required by the rule (e.g., three), the number of days until the flight must be ticketed (e.g., nine) is greater than the number of days $T_{PNR}$ required by the rule (e.g., three), and there are no penalties that must be accepted. The product may therefore be considered recoverable, and the itinerary may be booked and queued as the flight is the only critical product.

The context of a fifth scenario may include an itinerary comprising one critical product that is a hotel room which was reserved through a GDS (product type=HTL, GDS). The total value of the itinerary defined by the travel record may be 1000 BRL. A penalty may apply if the booking is canceled, and there may be four hours remaining between the current time and the end of the business day.

The above context may satisfy the input requirements of the rule defined in the first row of Table 12 by having a total value of less than 1500 BRL. The context may fail to satisfy the total value constraint of the rule defined by the second row of Table 12, and may fail to satisfy the amount or passenger type requirements of the rule defined by the third row of Table 12. Thus, the query to the recovery rules database 352 in this example may return the rule defined by the first row of Table 12.

Applying the returned rule to the present context, the product may fail to satisfy the rule due to the penalty. Because the returned rule is not satisfied, the determination process 350 may apply the default rule for hotels, which may be defined by the fourth row of Table 12. Thus, the product may be considered non-recoverable if there is less than one day between the current time and the time the hotel room will be used, in which case the determination process 350 may cancel payment. On the other hand, the hotel room may be considered recoverable if there are one or more days between the current time and the time the hotel room will be used.

The context of a sixth scenario may include an itinerary comprising critical products that include a hotel room which was not reserved through a GDS (product type=HTL, non-GDS), and a flight which was reserved through a GDS (product type=Air, GDS). The total value of the itinerary defined by the travel record may be 1800 BRL, and the itinerary may not contain any non-critical products. The last date on which a ticket can be issued for the flight may be 11 days after the flight is booked, no penalties may apply to the hotel, and there may be six hours remaining between the current time and the end of the business day.

Because the total value of the itinerary is greater than 1500 BRL, the above context may fail to satisfy the input requirements of the rule defined by the first row of Table 12, but may satisfy the input requirements of the rule defined by the second row of Table 12. The context may fail to satisfy the amount or passenger type requirement of the rule defined by the third row of Table 12. Thus, the recovery rules database 352 may return the rule defined by the second row of Table 12.

Applying the returned rule to the present context, the number of hours left before the end of the day (e.g., six) is greater than the $T_{EOB}$ required by the rule (e.g., five), the number of days until the flight must be ticketed (e.g., 11) is greater than the number of days $T_{PNR}$ required by the rule (e.g., 10), and there are no penalties that must be accepted. The products may therefore be considered recoverable, and the itinerary may be booked and queued as the flight and hotel are the only critical products.

The context of a seventh scenario may include an itinerary comprising critical products that include a flight which was reserved through a GDS (product type=Air, GDS), a pre-paid a hotel room (product type=HTL), a post-paid car rental (e.g., paid for upon pick-up), an attraction, and insurance. The total value of the itinerary defined by the travel record may be 8000 BRL, the car rental, attraction, and insurance may be non-critical products, and the attraction may have a cancellation penalty. The last date on which a ticket can be issued for the flight may be 12 days after the flight is booked, and there may be six hours remaining between the current time and the end of the business day.

Because the total value of the itinerary is greater than 1500 BRL, the context may fail to satisfy the input requirements of the rule defined by the first row of Table 12, but may satisfy the input requirements of the rule defined by the second row of Table 1. The context may fail to satisfy the amount or passenger type requirement of the rule defined by the third row of Table 12. Thus, the recovery rules database 352 may return the rule defined by the second row of Table 12.

Applying the returned rule to the present context, the number of hours left before the end of day (e.g., six) is greater than the $T_{EOB}$ required by the rule (e.g., five). With regard to the flight, the number of days until the flight must be ticketed (e.g., 12) is greater than the number of days $T_{PNR}$ required by the rule (e.g., 10), and there are no penalties that must be accepted to book the flight, so the flight may be considered recoverable. There are no penalties associated with the hotel room, so the hotel room may also be considered recoverable. Because all the critical products in the itinerary are recoverable, the determination process 350 may apply the rule to the non-critical products. The car rental and insurance have no cancellation penalties, and may therefore be considered recoverable. The attraction has a cancellation penalty, and is thus may be considered non-recoverable. The recoverable products of the itinerary (flight, hotel, car rental, and insurance) may be booked. The attraction product may not be booked, which may cause the travel record to be queued and a warning to be issued.

The context of an eighth scenario may include an itinerary comprising products that include a flight which was reserved through a GDS (product type=Air, GDS), a pre-paid a hotel room (product type=HTL), a post-paid car rental (e.g., paid for upon pick-up), an attraction, and insurance. The total value of the itinerary defined by the travel record may be 8000 BRL. The flight and hotel may be critical products, and the car rental, attraction, and insurance may be non-critical products. The attraction may carry a cancellation penalty. The last date on which a ticket can be issued for the flight may be two days after the flight is booked, and there may be six hours remaining between the current time and the end of the business day.

Because the total value of the itinerary is greater than 1500 BRL, the context may fail to satisfy the input requirements of the rule defined by the first row of Table 12, but may satisfy the input requirements of the rule defined in the second row of Table 12. The context may fail to satisfy the amount or passenger type requirement of the rule defined in the third row of Table 12. Thus, the recovery rules database 352 may return the rule defined in the second row of Table 12.

Applying the returned rule to the present context, the number of hours left before the end of day (e.g., six) is greater than the $T_{EOB}$ required by the rule (e.g., five), so the determination process 350 may check the critical products. There are no penalties associated with the hotel room, so the hotel room may also be considered recoverable. With regard to the flight, the number of days until the flight must be ticketed (e.g., two) is less than the number of days $T_{PNR}$ required by the rule (e.g., 10), so the flight may be considered non-recoverable. Because one of the critical products is considered non-recoverable, the determination process 350 may cancel payment.

Transaction Recovery Module

As described above, in some cases, processing of a transaction may be halted before the processing has completed. For example, the OLTP system 12 may halt processing of a transaction in response to detecting an error, such as a failure to confirm a booking or a failure to confirm issuance of a contract. The OLTP system 12 may also halt processing of a transaction until the results of a fraud analysis on a customer form of payment are received. In response to a booking or contract issuance error, the travel record may be queued and a warning issued indicating that manual intervention is required. For example, if a product in the itinerary is unavailable, the supplier system may be unable to issue a contract for the product, generating an error. In the case of a failure to confirm a booking or issuance of a contract for a product, a travel agent may intervene to modify the itinerary by replacing the unavailable product with a new product, or by removing the product from the itinerary. In either case, transaction processing may need to be restarted after the travel record has been modified.

Once the error has been resolved, a request may be sent to the OLTP system 12 requesting the OLTP system 12 restart processing. When processing is halted to wait for results of a fraud analysis, the OLTP system 12 may book the recoverable products and queue the travel record so that processing can be restarted in response to receiving the result of the fraud analysis. A restart may require that the OLTP system 12 determine what actions need to be performed to finalize the transaction, and the sequence in which those actions should be taken. This may require determining a state of the transaction so that transaction processing can be restarted at the correct point for each product in the itinerary.

Upon receiving a request to restart processing of a transaction, the transaction recovery module 68 may determine the state of the transaction based on the travel record, determine the remaining actions required to complete the transaction, and determine the order in which these actions should be executed. The transaction recovery module 68 may begin the restart process by de-queuing the travel record and determining the status of the transaction. Once the status of the transaction has been determined, the transaction recovery module 68 may send processing requests to one or more modules of the OLTP system 12 to complete processing of the transaction. These requests may be for selected products, and may be sequenced in the determined order by the transaction recovery module 68.

The transaction recovery module 68 may begin by determining actions that have been successfully completed, and actions which still need to be completed. Actions that need to be completed may vary for each product in the itinerary, and may include assigning a merchant to the product, determining a form of payment for the product, requesting fraud analysis of the form of payment, determining if the product is critical, determining if the product is recoverable, making a payment to the merchant, confirming booking of the product, issuing a contract for the product, and capturing payment for the product. Actions to be completed may also include fraud screening at the product or transaction level.

The restart process may be quite complex depending on the number of products, the number of suppliers, the total number of actions required to book the itinerary, and the number of scenarios under which a restart may be required. Restarting processing of a transaction may be further complicated by the possibility of the travel record being updated by a third party system, e.g., by an internet booking engine or manually by a travel agent while processing of the transaction was halted. For this reason, the transaction recovery module 68 may be unable to rely on a transaction history log.

Figure 20:
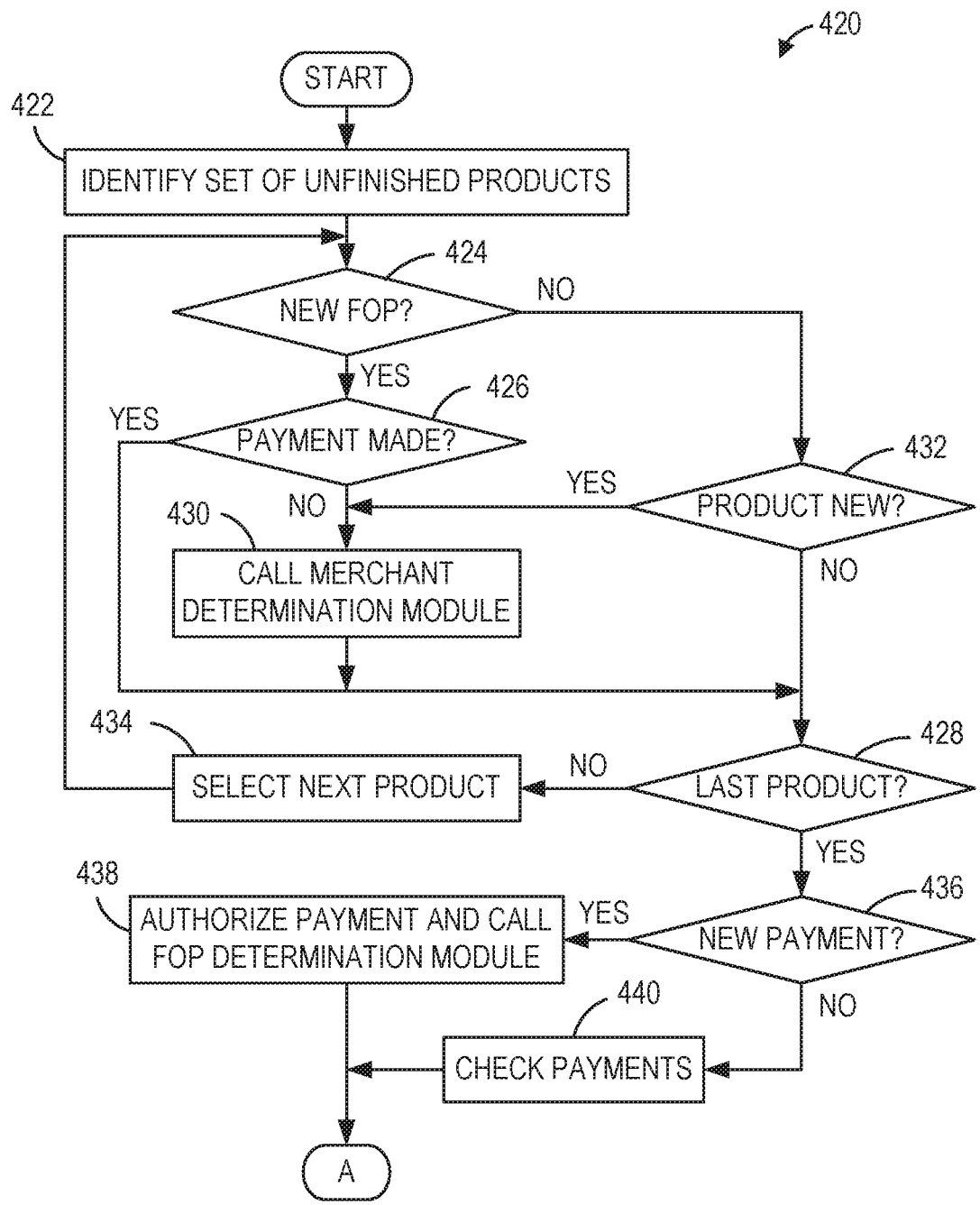
FIG. 20 is a flow chart of a portion of a transaction recovery process that may be implemented by the transaction recovery module of FIG. 3.
Figure 21:
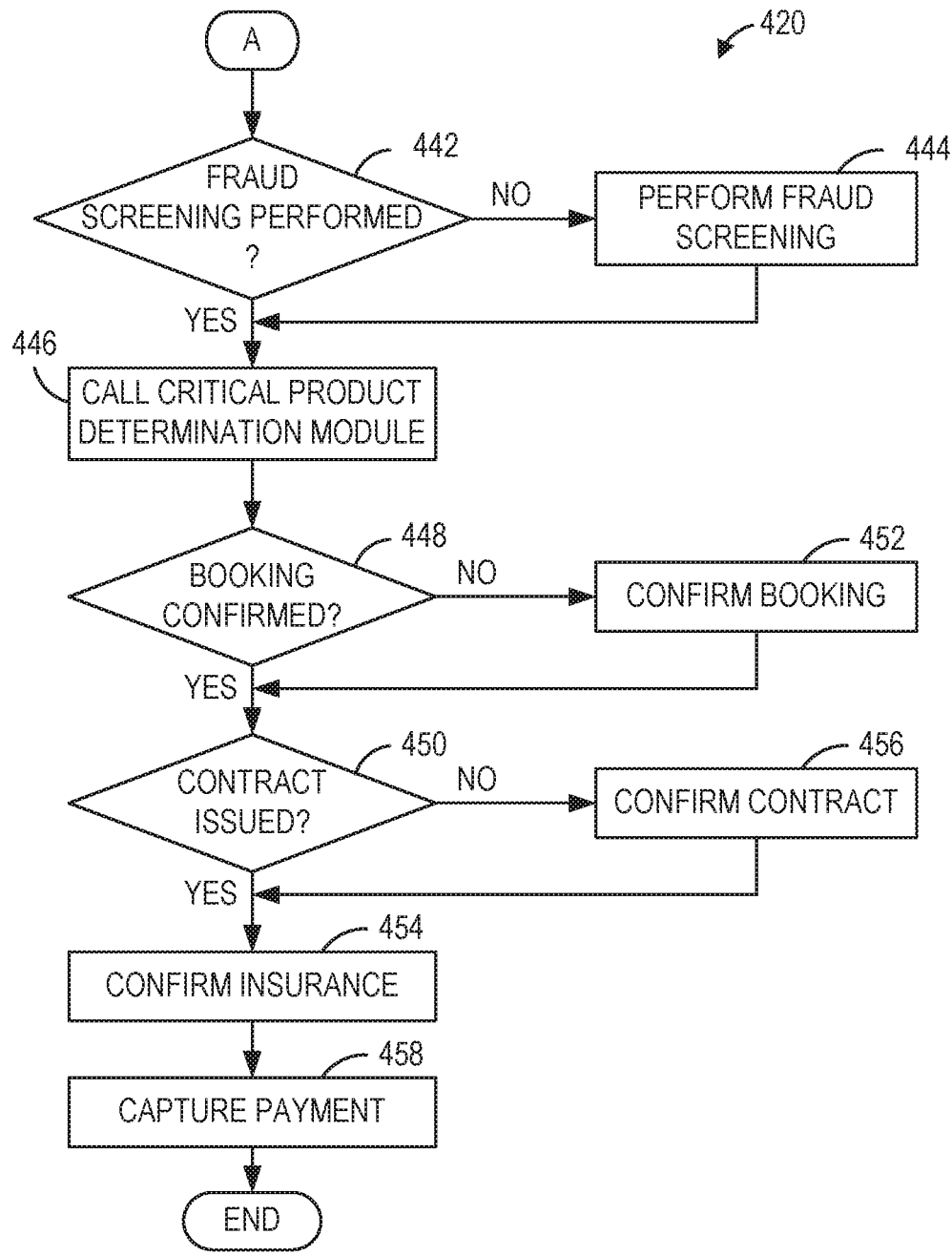
FIG. 21 is a flow chart of another portion of the transaction recovery process of FIG. 20.

FIGS. 20 and 21 depict a flowchart of a restart process 420 that may be implemented by an embodiment of the transaction recovery module 68 in response to receiving a request to restart processing of a transaction. In block 422, the restart process 420 may identify a set of products for which processing of the transaction is unfinished. The set of unfinished products may include, for example, products in the itinerary defined by the travel record for which a payment has not been made, a booking has not been confirmed, or a contract has not been issued.

In block 424, the restart process 420 may determine if a new form of payment has been defined in the travel record since processing of the transaction was halted. If a new form of payment has been defined in the travel record ("YES" branch of decision block 424), the restart process 420 may proceed to block 426 and determine if a payment has been made for the selected product. If the payment has been made ("YES" branch of decision block 426), the restart process 420 may proceed to block 428.

If payment has not been made for the selected product ("NO" branch of decision block 426), the restart process 420 may proceed to block 430. In block 430, the restart process 420 may request the merchant determination module 60 determine the merchant for the selected product. In cases where a merchant was previously assigned to the selected product in question, the merchant determination module 60 may override the previous merchant decision. In an embodiment of the invention, the merchant determination module 60 may only be called if the product is new. That is, if a merchant has not been previously determined for the product. In either case, once a merchant has been determined for the selected product, the restart process 420 may proceed to block 428.

Returning to block 424, if a new form of payment has not been defined in the travel record ("NO" branch of decision block 424), the restart process 420 may proceed to block 432. In block 432, the restart process 420 may determine if the selected product is a new product, i.e., if the product was added to the travel record while processing of the transaction was halted. If the selected product is a new product ("YES" branch of decision block 432), the restart process 420 may proceed to block 430 and call the merchant determination module 60. If the selected product is not a new product ("NO" branch of decision block 432), the restart process 420 may proceed to block 428.

In block 428, the restart process 420 may determine if all the products in the set of unfinished products have been processed. If the selected product is not the last product in the set ("NO" branch of decision block 428), the restart process 420 may proceed to block 434, select the next product, and return to block 424. If the selected product is the last product in the set ("YES" branch of decision block 428), the restart process 420 may proceed to block 436.

In block 436, the restart process 420 may determine if the travel record includes new payment information. If the travel record includes new payment information ("YES" branch of decision block 436), the restart process 420 may proceed to block 438 and request the payment system 24 obtain a payment authorization from an issuing bank. The restart process 420 may also request the form of payment module 62 determine the forms of payment being used to pay the supplier and the seller for the itinerary.

If the travel record does not include new payment information ("NO" branch of decision block 436), the restart process 420 may proceed to block 440 and check the payment status for all the products in the itinerary. This check may comprise summing all payments recorded in the travel record, and determining if the sum of payments matches a total amount of the transaction. If the sum of the individual payments recorded in the travel record does not match the total amount of the transaction, the restart process 420 may halt processing of the transaction and queue the travel record for manual intervention.

Once the forms of payment have been created in block 438 or the payments have been successfully checked in block 440, the restart process 420 may proceed to block 442. In block 442, the restart process 420 may check the fraud status of the customer form of payment. If the fraud status for the customer form of payment is not defined in the travel record ("NO" branch of decision block 442), the restart process 420 may proceed to block 444 and request the fraud screening system 26 perform a fraud analysis on the customer form of payment. If the fraud status or the result of the requested fraud screening indicates that the customer payment is fraudulent, or recommends subjecting the customer form of payment to a more rigorous security check, the restart process 420 may halt processing of the transaction and queue the travel record for manual intervention.

If the fraud screening has been performed ("YES" branch of decision block 442), or fraud screening result received in block 444 indicates that the customer form of payment is not fraudulent, the restart process 420 may proceed to block 446. In block 446, the restart process 420 may request the critical products module 64 determine which products in the travel record are critical products. Once the critical products module 64 has determine which products are critical, the restart process 420 may proceed to block 448.

In block 448, the restart process 420 may check the booking confirmation status for the products in the itinerary. If all the booking for each product in the itinerary has been confirmed ("YES" branch of decision block 448), the restart process 420 may proceed to block 450. If any of the products in the itinerary are not confirmed as booked ("NO" branch of decision block 448), the restart process 420 may proceed to block 452 and confirm booking for the unconfirmed products before proceeding to block 450.

In block 450, the restart process 420 may check if contracts have been issued for each of the products in the travel record. The restart process 420 may, for example, determine if a contract has been issued for a product based on an issued status data field associated with the product in the travel record. If contracts have been issued for each product in the itinerary ("YES" branch of decision block 450), the restart process 420 may proceed to block 454. If a contract has not been issued for each of the products ("NO" branch of decision block 450), the restart process 420 may proceed to block 456 and request the contract issuance module 72 establish contracts for products for which a contract has not been issued, and proceed to block 454.

In block 454, the restart process 420 may check for the presence of an insurance product in the travel record. If an insurance product is defined in the travel record, but has not been committed to, the restart process 420 may trigger a commit to the insurance product before proceeding to block 458. In block 458, the restart process 420 may check if the payments defined in the travel record have been captured. If payments have not been captured, and contracts have been issued for each product, the restart process 420 may trigger capture of any uncaptured payments.

By way of example, operation of the transaction recovery module 68 is described below using a hypothetical scenario. The scenario may include a traveler selecting three products (A, B, and C) to be included in an itinerary using an internet booking engine. To purchase the itinerary, the traveler may identify a credit card as the customer form of payment. The OLTP system 12 may successfully book each of the products. Requests to issue contracts for products A and B are successful, but a request to issue a contract for product C is not confirmed, which may cause the OLTP system 12 to log an error, halt processing of the transaction, and queue the travel record.

A travel agent in a call center may receive a warning from the OLTP system 12 indicating the error. To correct the error, the travel agent may modify the travel record by replacing product C with product D, and by providing a new form of payment for product D. The travel agent may then request that processing of the transaction be restarted. In response to receiving the request to restart processing, the transaction recovery module 68 may read the travel record and determine what actions to execute to complete the reservation.

The transaction recovery module 68 may determine that product D requires merchant assignment, payment authorization, fraud analysis, booking, and contract issuance. The transaction recovery module 68 may send a request to the merchant determination module 60 requesting the merchant determination module 60 assign a merchant to product D and update the travel record. The processing of product D may then be routed through the form of payment module 62, critical products module 64, recoverable products module 66, booking module 70, and contract issuance module 72.

In response to a contract being issued for product D, the transaction recovery module 68 may cause payment to be captured for products A, B and D. The transaction recovery module 68 may thereby orchestrate processing of the travel record by the other modules of OLTP system 12, with the actions of each module depending on the state of the travel record and the configuration of the rules databases queried by the modules. Each module may be independent and provide its own set of functionalities. Some module activations may be mandatory to restart the transaction, while others may be activated based on the configuration of the rules databases.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, web based services, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An online transaction processing system comprising:
one or more processors; and
a memory coupled to the one or more processors, the memory storing data comprising program code that, when executed by at least one of the one or more processors, causes the system to:
receive first data that defines a seller, a supplier, and a merchant for each of one or more products identified in a first database record defining an itinerary, wherein the first data is received while the itinerary is being purchased;
in response to the merchant being the seller for at least one of the products, retrieve a set of payment rules for determining a form of payment provided by the seller to the supplier of each product having the seller as the merchant;

for each product having the seller as the merchant, determine the form of payment provided by the seller to the supplier using the set of payment rules; and store second data in the first database record defining the itinerary, the second data defining the form of payment provided by the seller to the supplier for each product having the seller as the merchant.

2. The system of claim 1 wherein the first data further defines the form of payment provided by a buyer, and the program code is further configured to cause the system to:

store third data in the first database record, the third data defining the form of payment provided to the seller for each product having the seller as the merchant as being the form of payment provided by the buyer.

3. The system of claim 2 wherein the program code further causes the system to:

in response to receiving an authorization for the form of payment provided by the buyer, transmit a request for a fraud analysis on the form of payment to a fraud screening system; and in response to receiving a reply to the request for the fraud analysis that indicates fraud:
create a second database record indicating a status of the form of payment provided by the buyer as fraudulent, and
terminate processing of a transaction to purchase the products.

4. The system of claim 1 wherein the program code causes the system to retrieve the set of payment rules by:

transmitting a query that defines a set of input parameters to a database of rules; and identifying a rule in the database of rules that matches the set of input parameters.

5. The system of claim 1 wherein the program code causes the system to receive the first data by:

retrieving the first database record from a database of travel records; and extracting a portion of the first data that defines the seller and the supplier for each of the products identified by the first database record from the first database record.

6. The system of claim 5 wherein the program code further causes the system to:

update the first database record so that each product is associated with the merchant for the product, and the form of payment used to pay the merchant.

7. The system of claim 1 wherein the program code is further configured to cause the system to, in response to the set of payment rules failing to define the form of payment provided by the seller to the supplier for each product having the seller as the merchant:

log a failure in a database; and terminate processing of a transaction to purchase the products.

8. The system of claim 1 wherein the merchant for each product is one of the seller of the product or the supplier of the product.

9. A method of processing an online transaction, the method comprising:

receiving, at an online transaction processing system, first data that defines a seller, a supplier, and a merchant for each of one or more products identified in a first database record defining an itinerary, wherein the first data is received while the itinerary is being purchased;

in response to the merchant being the seller for at least one of the products, retrieving, by the system, a set of payment rules for determining a form of payment provided by the seller to the supplier of each product having the seller as the merchant;

for each product having the seller as the merchant, determining, by the system, the form of payment provided by the seller to the supplier using the set of payment rules; and storing, by the system, second data in the first database record defining the itinerary, the second data defining the form of payment provided by the seller to the supplier for each product having the seller as the merchant.

10. The method of claim 9 wherein the first data further defines the form of payment provided by a buyer, and further comprising:

storing third data in the first database record, the third data defining the form of payment provided to the seller for each product having the seller as the merchant as being the form of payment provided by the buyer.

11. The method of claim 10 further comprising:

in response to receiving an authorization for the form of payment provided by the buyer, transmitting a request for a fraud analysis on the form of payment provided by the buyer to a fraud screening system; and in response to receiving a reply to the request for the fraud analysis that indicates fraud:
creating a second database record indicating a status of the form of payment provided by the buyer as fraudulent, and
terminating the processing of the online transaction.

12. The method of claim 9 wherein retrieving the set of payment rules comprises:

transmitting a query that defines a set of input parameters to a database of rules; and identifying a rule in the database of rules that matches the set of input parameters.

13. The method of claim 9 wherein receiving the first data comprises:

retrieving the first database record from a first database of travel records; and extracting a portion of the first data that defines the seller and the supplier for each of the products identified by the first database record from the first database record.

14. The method of claim 13 wherein the first data is retrieved from the first database in response to receiving a request to book the products.

15. The method of claim 13 further comprising:

updating the first database record so that each product is associated with the merchant for the product, and the form of payment used to pay the merchant.

16. The method of claim 13 further comprising:

in response to the first data failing to define each product comprising the itinerary of a buyer, or failing to define the seller and the supplier for each of the products, logging a failure in a second database.

17. The method of claim 9 further comprising:

in response to the set of payment rules failing to define the form of payment for each product having the seller as the merchant:
logging the failure in a database; and
terminating the processing of the online transaction.

18. The method of claim 9 wherein the merchant for each product is one of the seller or the supplier of the product.

19. The method of claim 9 wherein the set of payment rules are retrieved from a database of payment rules, each form of payment includes sensitive information, and further comprising:

for each payment rule, associating, with the payment rule in a database, an identifier that identifies of the form of payment to be used for each product matching the payment rule without using the sensitive information, wherein the second data defines the form of payment using only the identifier so that the sensitive information is not stored in the first database record.

20. A computer program product for processing an online transaction, the computer program product comprising:

a non-transitory computer-readable storage medium; and program code stored on the non-transitory computer-readable storage medium that, when executed by one or more processors, causes the one or more processors to:

receive first data that defines a seller, a supplier, and a merchant for each of one or more products identified in a first database record defining an itinerary, wherein the first data is received while the itinerary is being purchased;

in response to the merchant being the seller for at least one of the products, retrieve a set of payment rules for determining a form of payment to the supplier of each product having the seller as the merchant;

for each product having the seller as the merchant, determine the form of payment to the supplier using the set of payment rules; and store second data in the first database record defining the itinerary, the second data defining the form of payment to the supplier for each product having the seller as the merchant.

* * * * *